US010696146B2

(12) United States Patent
Haberkamp et al.

(10) Patent No.: US 10,696,146 B2
(45) Date of Patent: Jun. 30, 2020

(54) FRONT TOP ASSEMBLY FOR SUV

(71) Applicant: Bestop, Inc., Louisville, CO (US)

(72) Inventors: William H. Haberkamp, Rochester Hills, MI (US); George C. Stickles, Thornton, CO (US); Duane C. Junkin, Madison Heights, MI (US); Stephen J. Lewis, Harrison Township, MI (US)

(73) Assignee: Bestop, Inc., Louisville, CO (US)

( * ) Notice: Subject to any disclaimer, the term of this patent is extended or adjusted under 35 U.S.C. 154(b) by 0 days.

(21) Appl. No.: 15/725,884

(22) Filed: Oct. 5, 2017

(65) Prior Publication Data
US 2018/0029455 A1 Feb. 1, 2018

Related U.S. Application Data

(63) Continuation-in-part of application No. 15/276,386, filed on Sep. 26, 2016, now Pat. No. 9,931,921, and a continuation-in-part of application No. 15/128,773, filed as application No. PCT/US2015/022716 on Mar. 26, 2015, now Pat. No. 9,944,155, said application No. 15/276,386 is a continuation-in-part of application No. 14/831,414, filed on Aug. 20, 2015, now Pat. No. 9,539,888, and a continuation-in-part of application No. 14/808,011, filed on Jul. 24, 2015, now Pat. No. 9,517,684, said application No. 14/831,414 is a continuation-in-part of application No. PCT/US2015/022716, filed on Mar. 26, 2015, and a continuation-in-part of application No. 14/243,359, filed on Apr. 2, 2014, now Pat. No. 9,139,073, said application No.
(Continued)

(51) Int. Cl.
*B60J 7/12* (2006.01)
*B60J 10/90* (2016.01)

(52) U.S. Cl.
CPC ............. *B60J 7/1291* (2013.01); *B60J 10/90* (2016.02)

(58) Field of Classification Search
CPC ................................. B60J 7/12; B60J 7/1291
USPC ......................................................... 296/219
See application file for complete search history.

(56) References Cited

U.S. PATENT DOCUMENTS 3,819,227 A  6/1974 Carli
6,206,450 B1 *  3/2001 Ide .................. B60J 7/1291
                                               296/107.09
(Continued)

FOREIGN PATENT DOCUMENTS

BE        350 963 A       4/1928
DE     29715809 U1      10/1997
(Continued)

OTHER PUBLICATIONS

International Search Report for International Application No. PCT/US2015/022716, dated Jun. 12, 2015.
(Continued)

*Primary Examiner* — Dennis H Pedder
(74) *Attorney, Agent, or Firm* — Warn Partners, P.C.

(57) ABSTRACT

An articulating front top cover assembly for a vehicle in sealing engagement with a hard top portion of a roof. The articulating portion is operably connected to a frame. An articulating portion movable between at least a closed position over the front vehicle compartment and open position for an open air feel.

10 Claims, 33 Drawing Sheets

Related U.S. Application Data

14/808,011 is a continuation-in-part of application No. 14/243,359.

(60) Provisional application No. 62/404,321, filed on Oct. 5, 2016, provisional application No. 61/807,506, filed on Apr. 2, 2013, provisional application No. 61/970,463, filed on Mar. 26, 2014.

(56) References Cited

U.S. PATENT DOCUMENTS

| | | |
|---|---|---|
| 6,409,247 B1 | 6/2002 | Maass |
| 9,346,342 B1 | 5/2016 | Bowles |
| 9,776,488 B2 | 10/2017 | Bowles |
| 2001/0030443 A1 | 10/2001 | Barker |
| 2004/0108747 A1 | 6/2004 | Obendiek |
| 2004/0130188 A1 | 7/2004 | Stevens et al. |
| 2005/0134096 A1 | 6/2005 | Fallis, III et al. |
| 2012/0098292 A1 | 4/2012 | Huotari et al. |
| 2012/0286540 A1 | 11/2012 | Moran |
| 2014/0103682 A1 | 4/2014 | Lewis et al. |
| 2014/0138983 A1 | 5/2014 | Haderkamp et al. |
| 2014/0300143 A1 | 10/2014 | Haberkamp et al. |
| 2015/0123422 A1 | 5/2015 | Bennett et al. |
| 2015/0246605 A1 | 9/2015 | Kleinhoffer et al. |
| 2015/0352937 A1 | 12/2015 | Haberkamp et al. |
| 2016/0236556 A1 | 8/2016 | Smith et al. |
| 2016/0263975 A1 | 9/2016 | Bowles |

FOREIGN PATENT DOCUMENTS

| | | |
|---|---|---|
| DE | 19927234 C1 | 7/2000 |
| DE | 101 02 643 A1 | 7/2002 |
| DE | 202011105496 U1 | 1/2012 |
| EP | 1634748 A2 | 3/2006 |
| FR | 2745778 A1 | 9/1997 |
| FR | 2937591 A1 | 4/2010 |
| GB | 296586 A | 9/1928 |
| GB | 311 081 A | 5/1929 |
| GB | 336 514 A | 10/1930 |
| WO | 0132455 A2 | 5/2001 |
| WO | 2004/056596 A2 | 7/2004 |

OTHER PUBLICATIONS

Extended European Search Report for Application No. EP 16 18 5007, dated Jan. 3, 2017.
Extended European Search Report for Application No. EP 17 19 4977 dated Mar. 26, 2018.

* cited by examiner

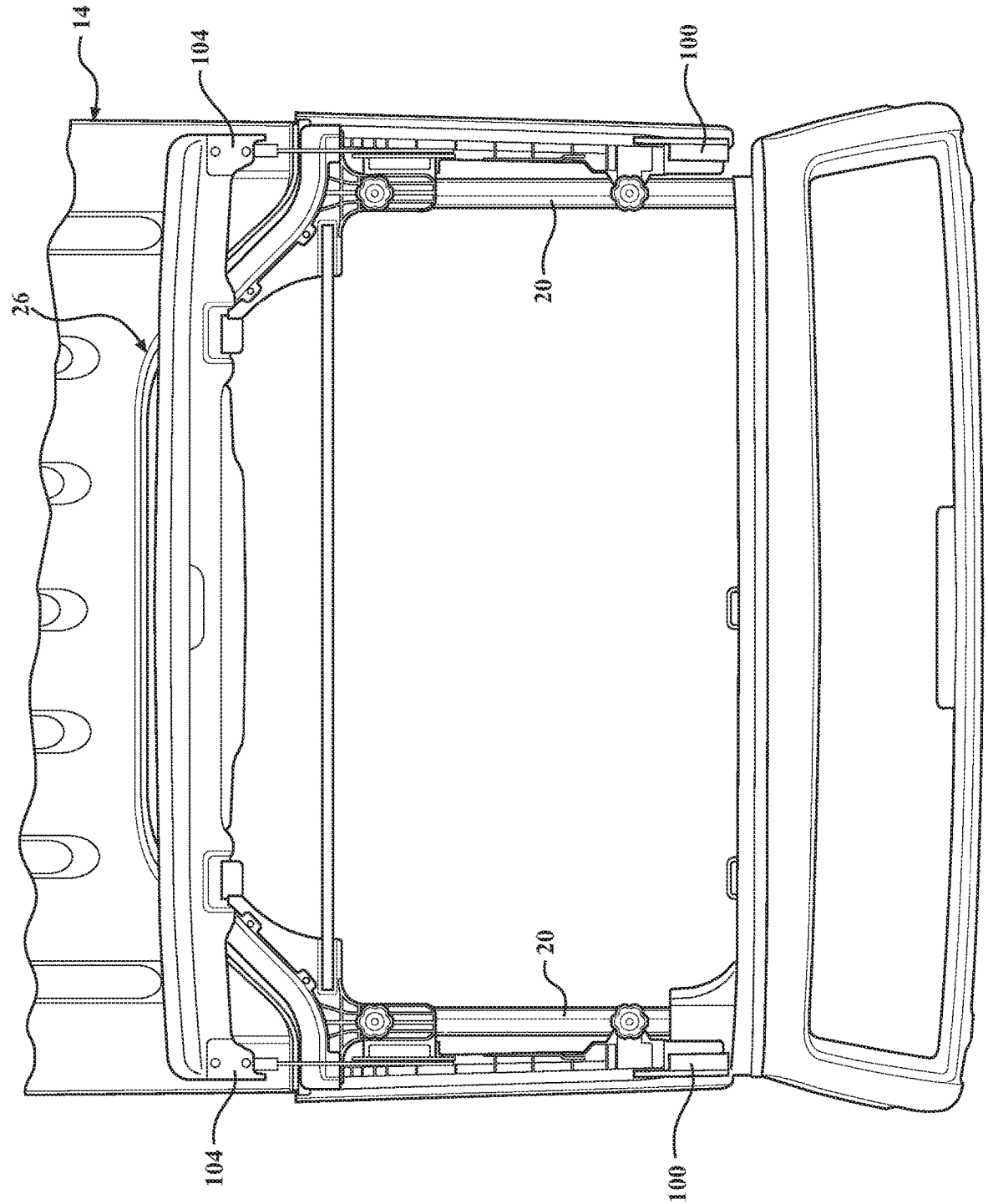

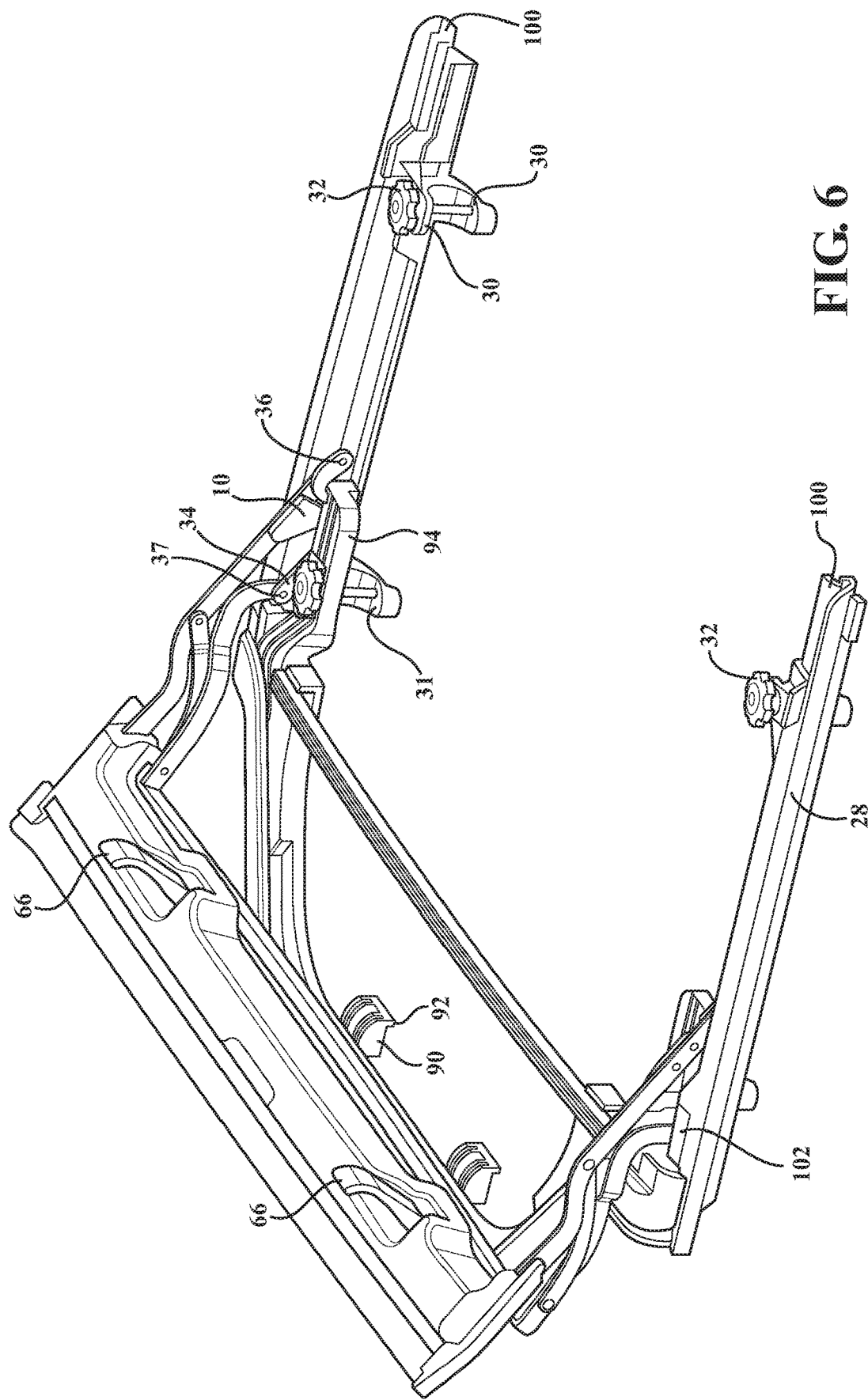

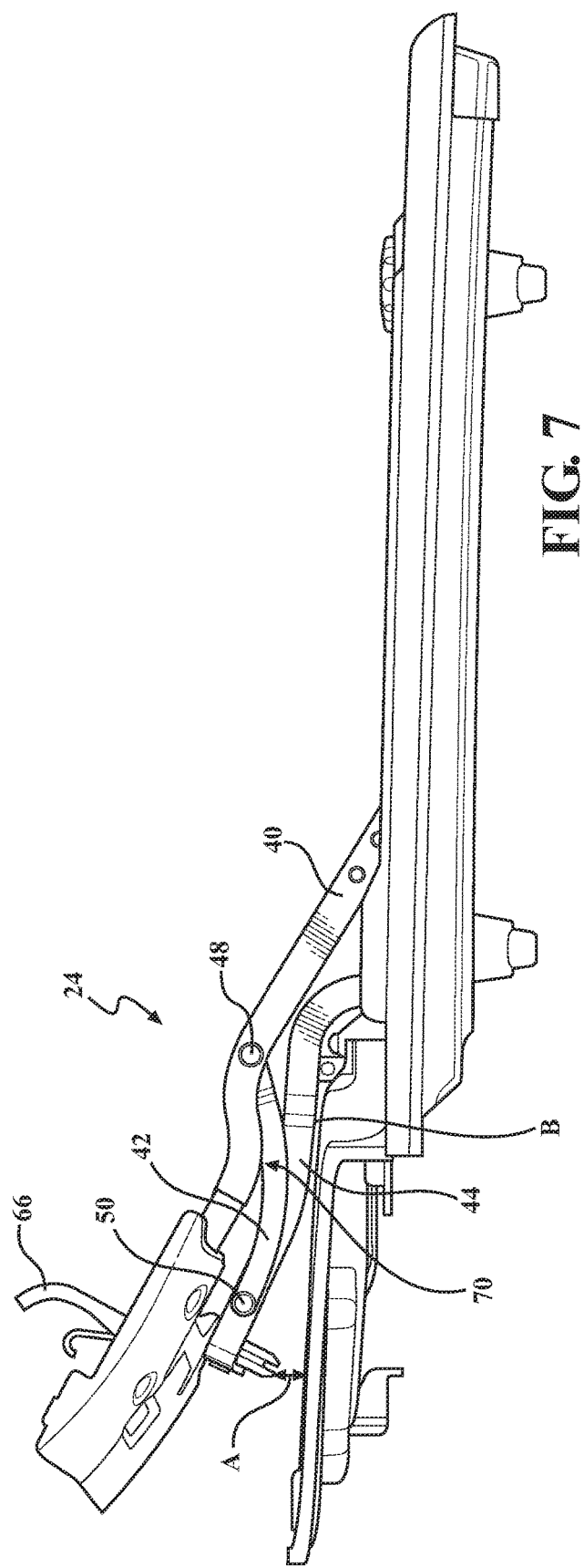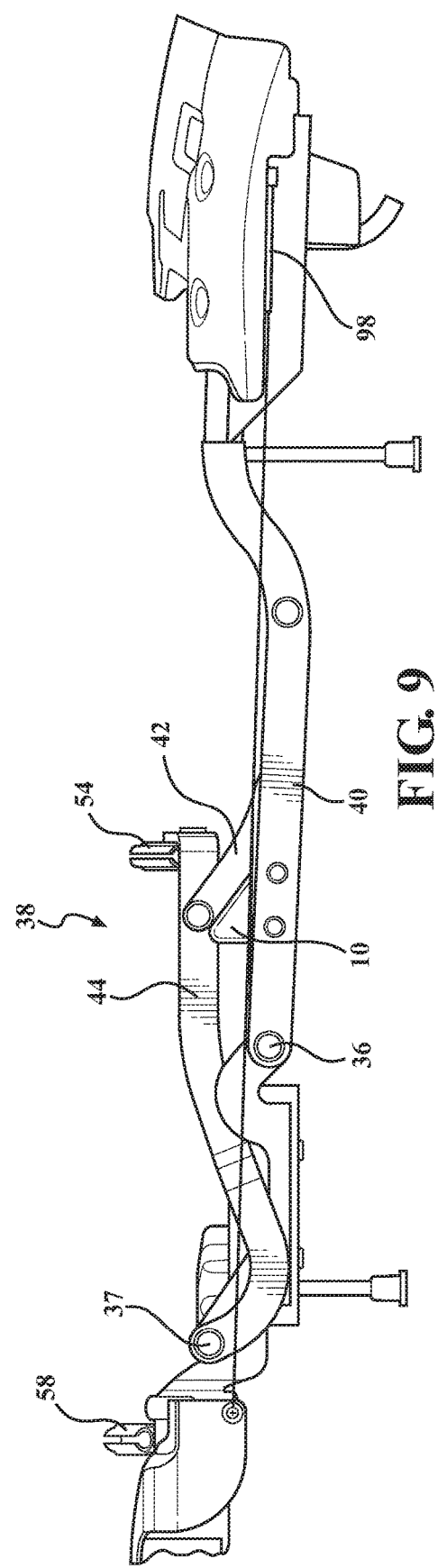

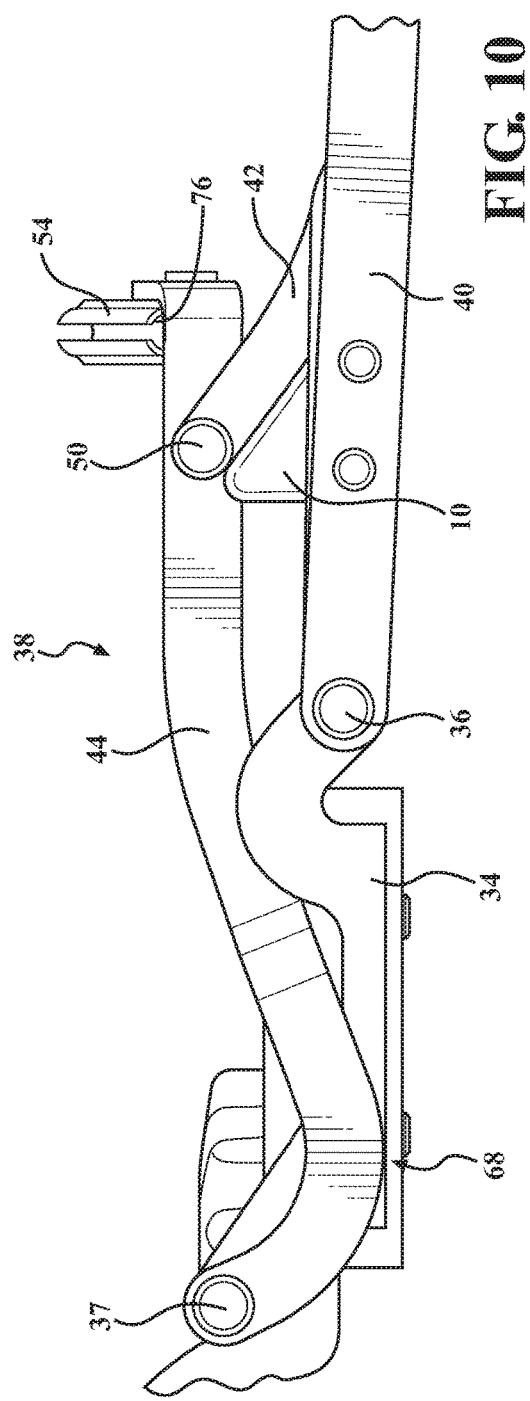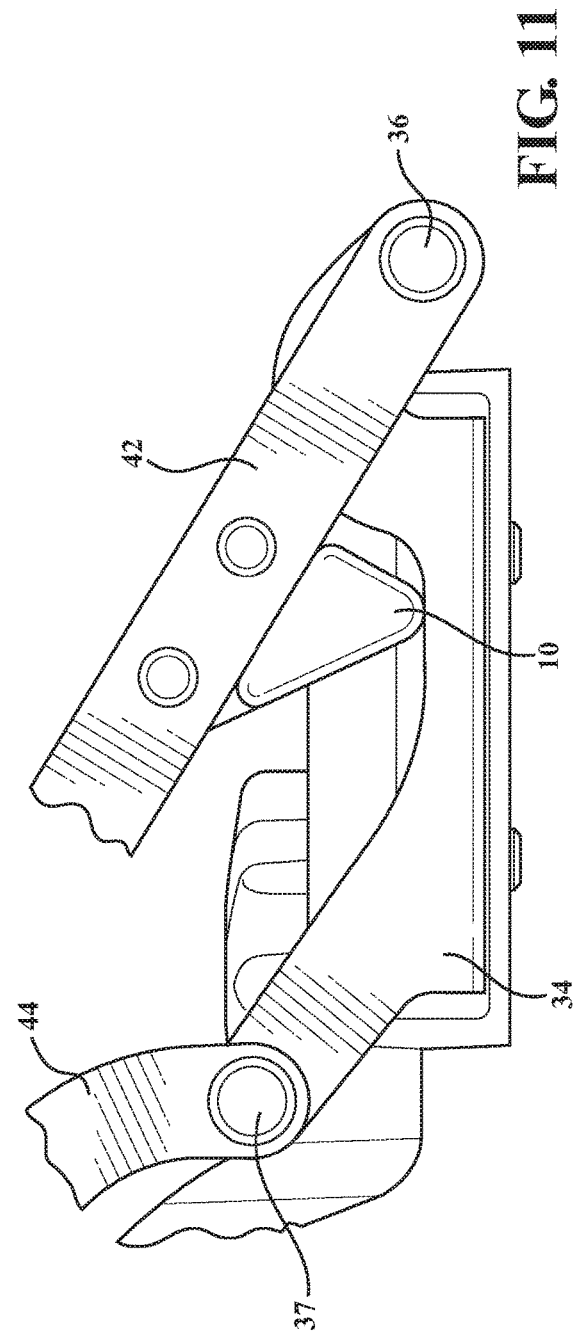

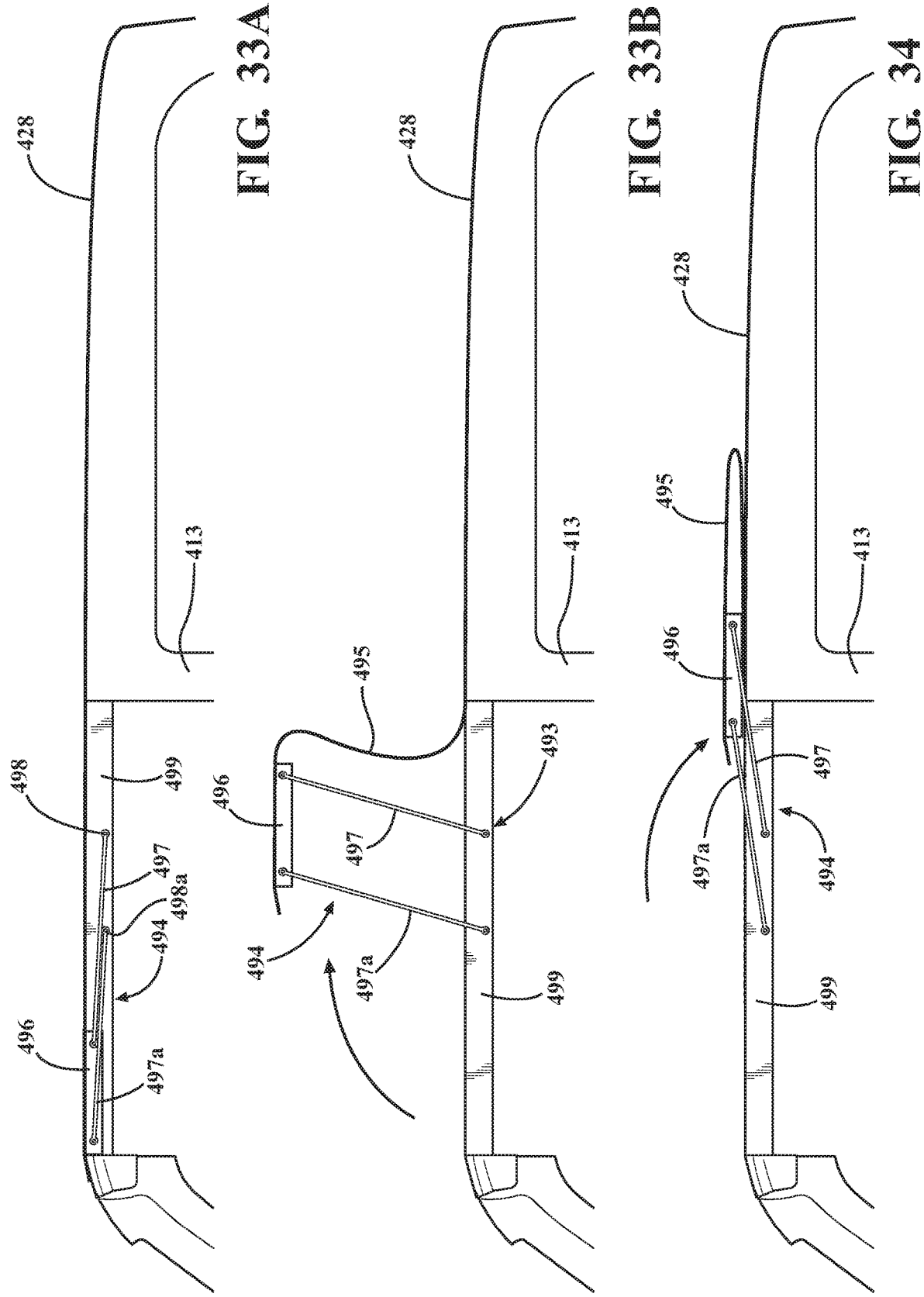

FRONT TOP ASSEMBLY FOR SUV

CROSS-REFERENCE TO RELATED APPLICATIONS

The instant application is a continuation-in-part of U.S. patent application Ser. No. 15/276,386, filed Sep. 26, 2016, which is a continuation-in-part of U.S. patent application Ser. No. 14/831,414, filed Aug. 20, 2015, issued as U.S. Pat. No. 9,539,888, which is a continuation-in-part patent application of U.S. patent application Ser. No. 14/243,359, filed Apr. 2, 2014, issued as U.S. Pat. No. 9,139,073, which claims the benefit of U.S. Provisional Application No. 61/807,506, filed Apr. 2, 2013, and which U.S. patent application Ser. No. 14/831,414 is also a continuation-in-part of PCT International Patent Application No. PCT/US2015/022716, filed Mar. 26, 2015, which claims the benefit of U.S. Provisional Application No. 61/970,463, filed Mar. 26, 2014, and which U.S. patent application Ser. No. 15/276,386, filed Sep. 26, 2016, is also a continuation-in-part of U.S. patent application Ser. No. 14/808,011, filed Jul. 24, 2015, issued as U.S. Pat. No. 9,517,684, which is a continuation of U.S. patent application Ser. No. 14/243,359, filed Apr. 2, 2014, issued as U.S. Pat. No. 9,139,073, which claims the benefit of U.S. Provisional Application No. 61/807,506, filed Apr. 2, 2013, and which U.S. patent application Ser. No. 15/276,386, filed Sep. 26, 2016, is also a continuation-in-part patent application of U.S. patent application Ser. No. 15/128,773, filed Sep. 23, 2016, which is a 371 of PCT International Patent Application No. PCT/US2015/022716, filed Mar. 26, 2015, which claims the benefit of U.S. Provisional Application No. 61/970,463, filed Mar. 26, 2014, and, in addition, the instant application is a continuation-in-part patent application of U.S. patent application Ser. No. 15/128,773, filed Sep. 23, 2016, which is a 371 of PCT International Patent Application No. PCT/US2015/022716, filed Mar. 26, 2015, which claims the benefit of U.S. Provisional Application No. 61/970,463, filed Mar. 26, 2014. The instant application, additionally, claims the benefit of U.S. Provisional Application No. 62/404,321, filed Oct. 5, 2016. The disclosures of the above applications are incorporated herein by reference.

FIELD OF THE INVENTION

The present invention relates to a roof assembly having a soft panel top cover that seals against a hard top portion of the roof for a vehicle.

BACKGROUND OF THE INVENTION

Providing convertible tops for sport utility (SUV) type vehicles is desired. In recent years, softop technology has advanced.

Foldable stowable roof soft tops are commonly used in sport-utility vehicles for recreational purposes. The foldable roof is typically moved between a stowed position, and a deployed position. When in the deployed position, the foldable roof protects the occupants of the vehicle from various weather conditions. The foldable roof also includes various sections which are made of a clear material to essentially function as a window, allowing the occupant of the vehicle to see outside of the vehicle. However, there are occasions where the weather is pleasant, and it is desired by the occupants of the vehicle to move the foldable roof to an open position such that the vehicle essentially functions without part of a roof or essentially functions without a roof, and the passenger compartment of the vehicle is exposed to the atmosphere. This allows the occupants of the vehicle to enjoy more favorable weather conditions while driving.

An alternative to the convertible soft top is to use a hard top that is bulky and does not provide any open air feel without removing the entire top. If the entire hard top is removed, it then must be stored, which is often difficult because of the size of the top. Other convertible roofs use a hard top that is large and bulky and does not provide any open air feel without removing two front top panels, which is also laborious, difficult, time consuming, and ergonomically disadvantageous. If one or more of the front top panels are removed, they then must also be stored, which is often difficult because of the size weight of the panels. While this will give the occupant an open air feel, the panels are large and bulky. If the occupant wants to gain the open air feel they need to exit the vehicle and remove the panels using multiple knobs and latches and then store the panels. This makes for a time consuming operation as well as a potential storage issue due to the size of the panels. They are also hard to handle due to their size and weight and due to the fact they must be installed and removed over the operators head. In the event of inclement weather, the panels also cannot be quickly put back in place.

Accordingly, there exists a need for a more manageable and easily stowable top made of articulable material or arrangement to provide a top that can be opened quickly to provide what is often referred to as an open air feel, where a portion of the top of the roof is moved from a closed or deployed position to an open or stowed position exposing a portion of the inside vehicle cockpit/passenger compartment to the outside without removing the top.

SUMMARY OF THE INVENTION

The present invention is directed to a foldable roof assembly having a soft panel top assembly that is in sealing engagement with a hard top portion of the roof. The soft panel top assembly has a pivotal portion that is lightweight and folds back without the operator needing to leave the vehicle to give the occupant a quick and easy sunroof/open air feeling in the front cockpit. This is done more easily than with typical two-panel hard top systems that are more time consuming to disengage from the vehicle and are bulky to handle and remove. The present invention also eliminates storage issues since the soft panel top folds back rather than having to be removed entirely and stored as with conventional hard top panels.

The soft panel top assembly has two door rails connected to side sport bars of the vehicle providing a sealing surface for the doors of the vehicle as well as pivot points for the pivotal portion of the soft panel top assembly. The soft panel top assembly has two side rail linkage assemblies connected to a first bow member that is secured to a windshield frame with quick release latches. Each side bow linkage assembly is connected to opposing ends of a fixed bracket connected to the respective door rail creating the pivot points with the use of the brackets. The soft panel top assembly includes a rear header that is a closeout for sealing engagement with an existing seal of the hard top roof portion. The soft panel top assembly is made lightweight by using a lighter rear header, e.g., rear header closeout that is a wireframe and/or lightweight molded section(s), and by using minimal framing and mostly soft goods. This further helps with ease of installation and ease of cycle efforts of the pivotal portion. Further, the assembly is mountable to the vehicle without any modification, drilling of holes, or any other change to existing hardware and structure to the vehicle other than the removal of the manufacturers existing front cockpit panels.

In another embodiment, the rear header portion of the soft panel top assembly includes at least one bulb seal. When the rear header portion is installed on the vehicle the existing seal of the hard top roof portion is compressed, and the bulb seal of the soft panel top assembly contacts at least one surface of the hard top roof portion, the existing hard top seal, and also a binding edge of the rear header portion. This creates a weatherproof seal between the soft and hard top portions. At least one tertiary seal is also provided along the length of the rear header portion as a back-up weather resistant seal.

According to an aspect of the present invention, a fabric cover is supported by a frame that is at least partially articulating, e.g., folded and/or pivoted, and/or slid or otherwise moved in any manner, from at least a closed position to at least one open air position. An attachment portion. e.g., cassette and/or door rails, can provide attachment for the frame to the vehicle and/or sealing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a top plan view of FIG. 1 with the soft panel top cover assembly shown in an open position;

FIG. 6 is a right perspective view of the soft panel top cover assembly of FIG. 1 with a pivotable portion in an open position;

FIG. 7 is a side elevation view of the soft panel top cover assembly of FIG. 1 in an open position;

FIG. 9 is a side elevation view of the soft panel top cover assembly of FIG. 1 in a closed position;

FIG. 10 is a side elevation view of a side rail linkage assembly in a closed position;

FIG. 11 is an enlarged side elevation view of the side rail linkage assembly in an open position;

FIGS. 33A-34 are side elevation views of a soft panel top cover assembly shown from a closed to an open position connected to a 2-door vehicle, in accordance with another embodiment of the present invention;

DETAILED DESCRIPTION OF THE PREFERRED EMBODIMENTS

Figure 1:
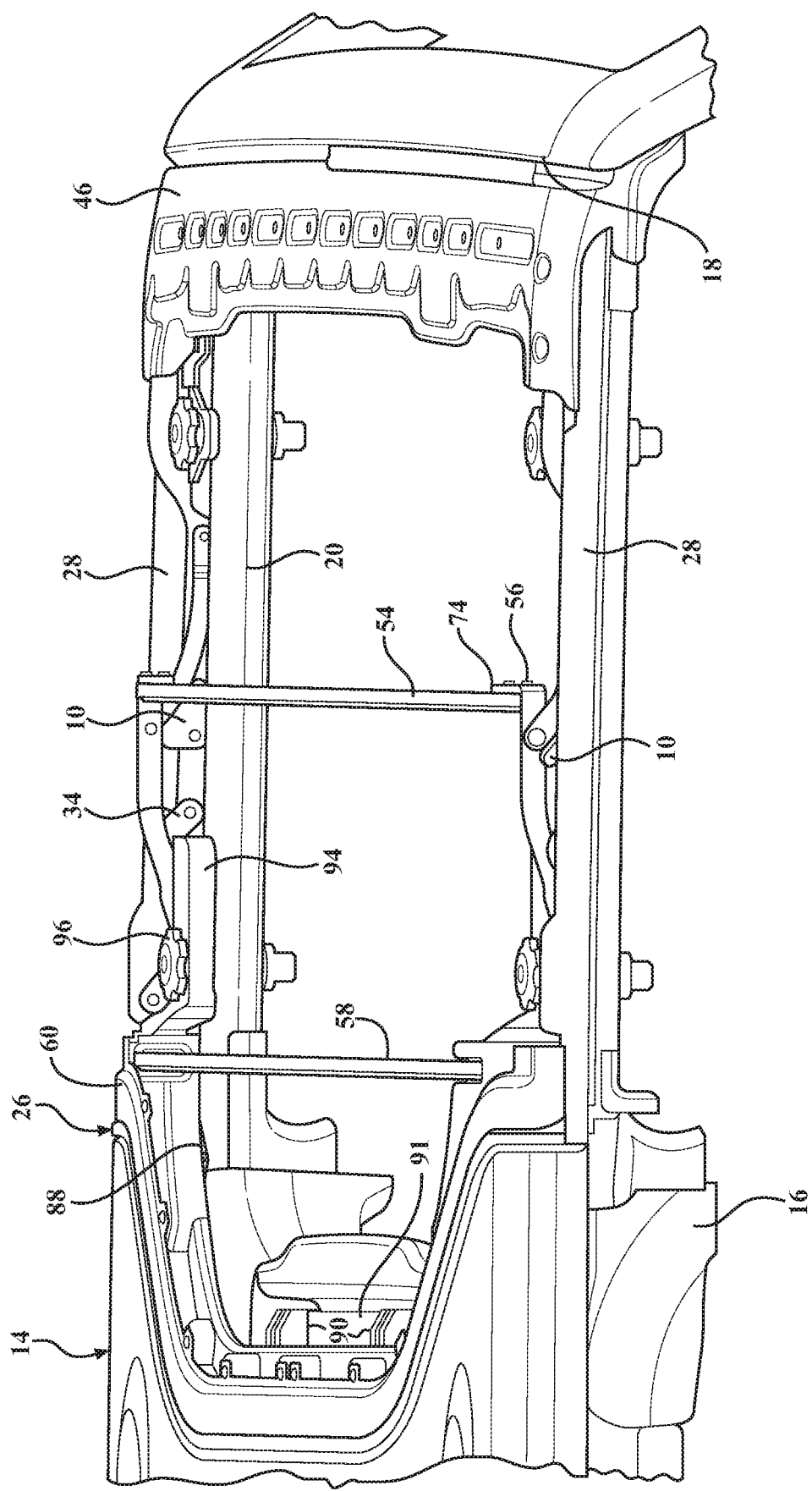
FIG. 1 is a perspective view of a soft panel top cover assembly in a closed position with the fabric cover removed for clarity connected to a vehicle and in sealing engagement with a hardtop portion, in accordance with the present invention.
Figure 2:
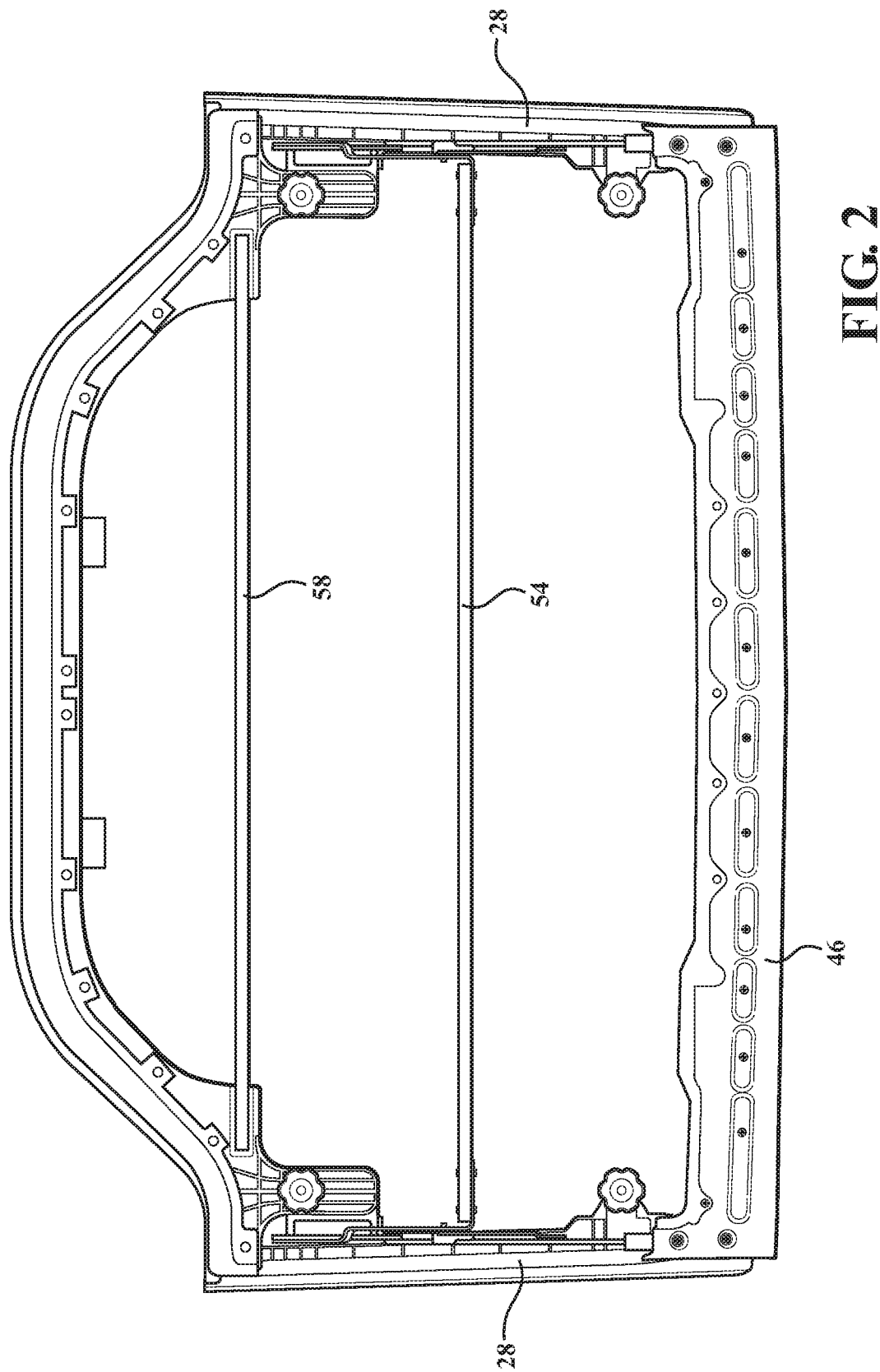
FIG. 2 is a top plan view of the soft panel top cover assembly of FIG. 1.
Figure 3:
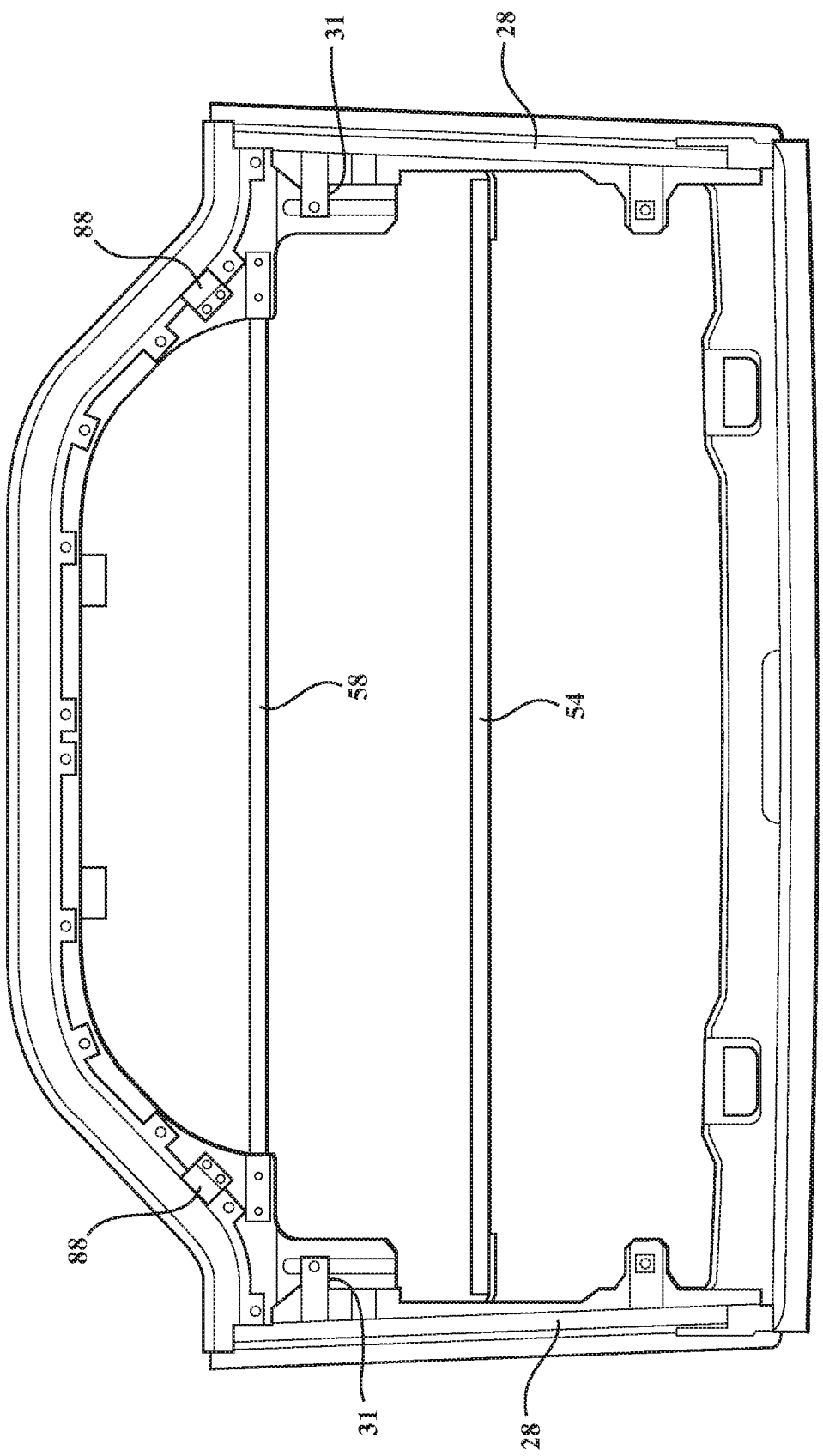
FIG. 3 is a bottom plan view of the soft panel top cover assembly of FIG. 1.
Figure 4:
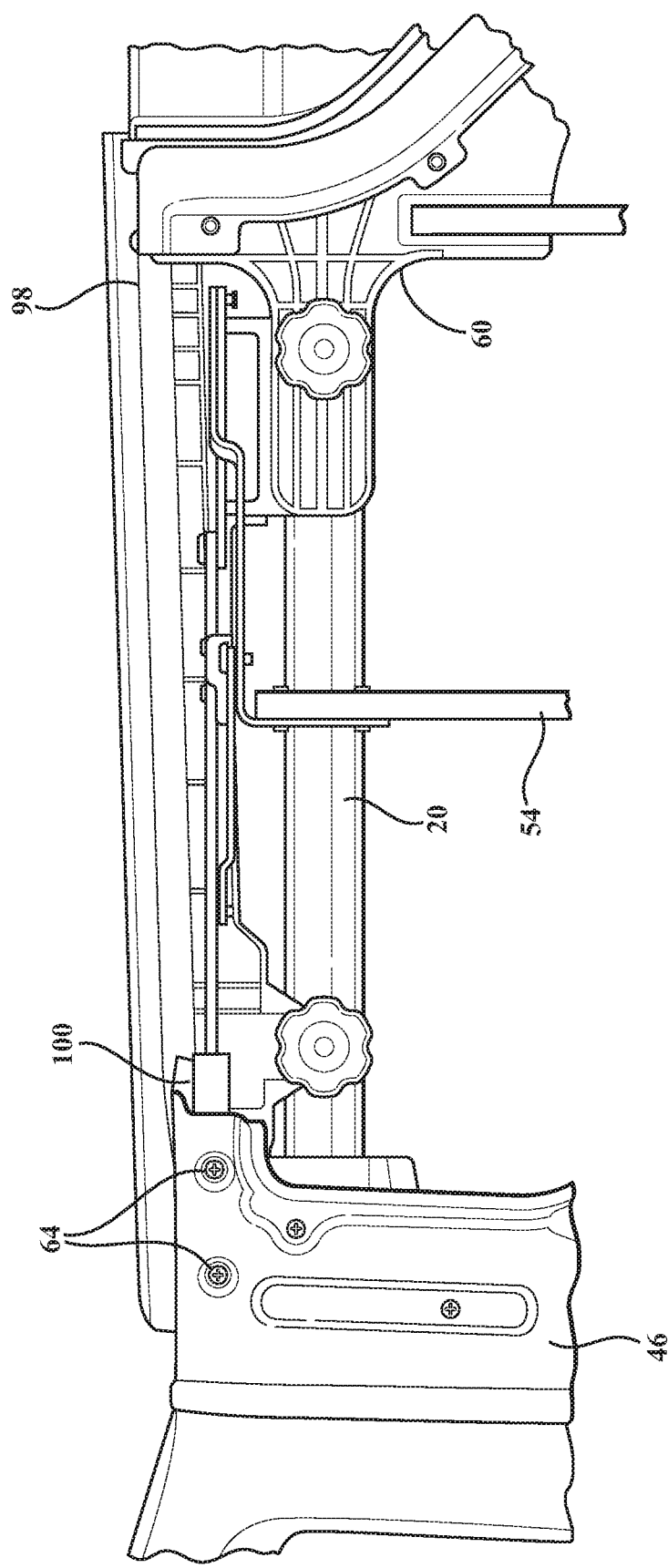
FIG. 4 is a top plan view of the soft panel top cover assembly of FIG. 1 in a closed position.
Figure 8:
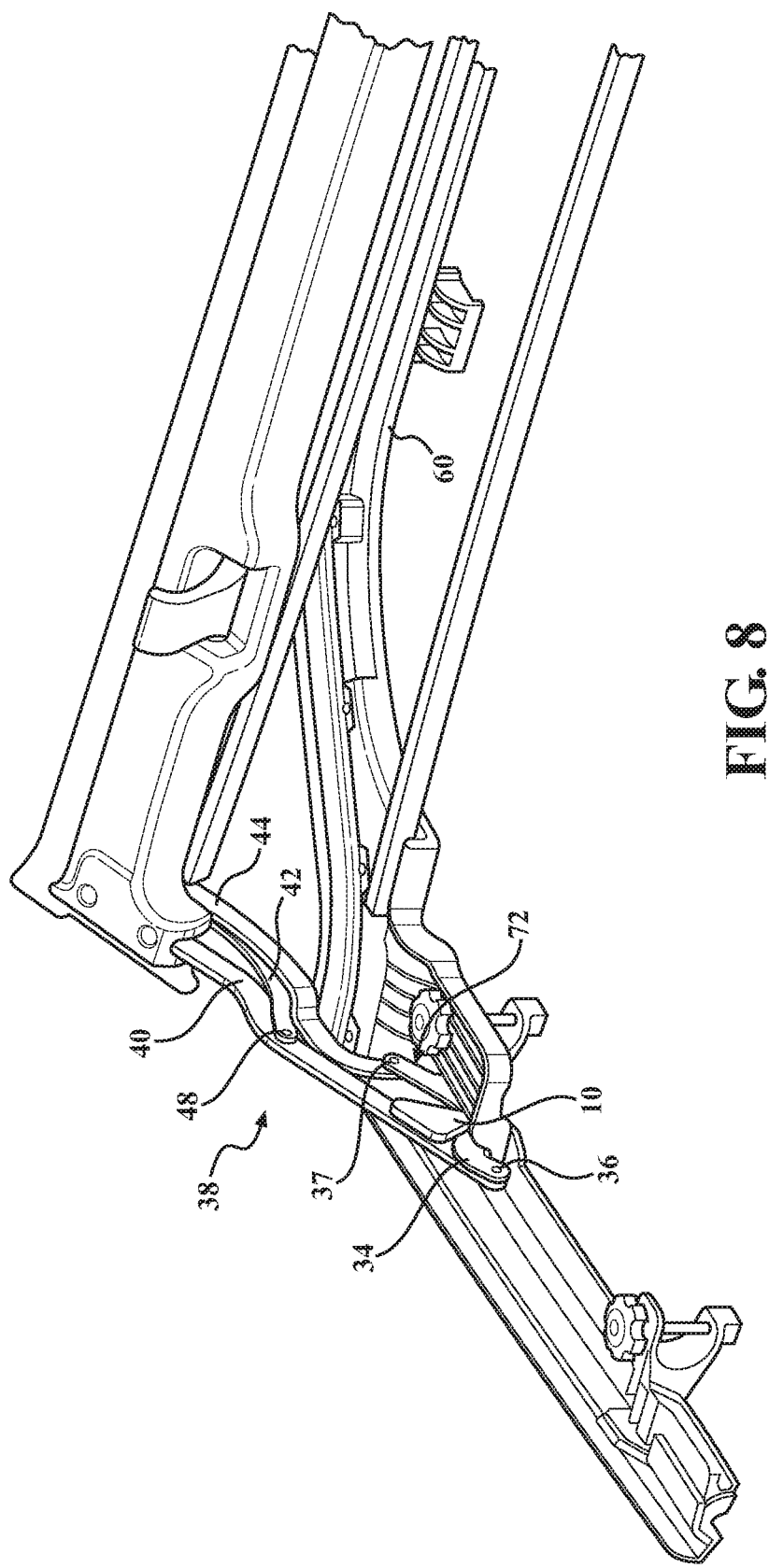
FIG. 8 is a left perspective view of the soft panel top cover assembly in an open position.

The following description of the preferred embodiment(s) is merely exemplary in nature and is in no way intended to limit the invention, its application, or uses.

Referring generally to FIGS. 1-16, there is provided a soft panel top assembly generally shown at 12 that is foldable and sealable with a hard top roof portion generally shown at 14. The soft panel top assembly 12 is connected to a vehicle 16. The vehicle 16 includes a windshield frame 18 with side members 20, e.g., sport bars, extending therefrom and a cross bar or cross member 91 operably connecting the side members 20 substantially adjacent the rear of the driver/passenger compartment.

The soft panel top assembly 12 folds back to give the occupant a quick and easy open air effect, e.g., lightweight and easily operated at a short interval stop, without completely removing the soft panel top assembly 12 from the vehicle 16. Folding the soft panel top assembly 12 between a closed position and an open position is also achievable without the occupant needing to leave the vehicle and eliminates removal and storage of roof panels from the vehicle. Once cycled to the open position, the soft panel top assembly 12 also does not require strapping the assembly down to maintain open air positioning. Further, the soft panel top assembly 12 includes built in stops 10, e.g., bump stops, to prevent over cycling past the desired open position.

The soft panel top assembly 12 has a pivotal portion indicated generally at 24 (FIGS. 7 and 13) for pivoting the soft panel top assembly 12 between the deployed or closed position and a stowed or open position. The assembly 12 geometry generally follows the hardtop 14 contours and seals against the hardtop's bulb seal. When the soft panel top assembly 12 is cycled between the closed/open position, the soft panel top assembly 12 remains in the sealing engagement with the hard top roof portion's 14 bulb seal, generally indicated at sealing portion 26. When the soft panel top assembly 12 is in the closed position the soft panel top assembly 12 also seals with the vehicle windshield frame's 18 bulb seal.

The soft panel top assembly 12 has at least two door rails 28 each operably connected to a respective side sport bar 20 of the vehicle 16. The door rails 28 provide a sealing surface shown generally at 29 for the driver/passenger doors 13 of the vehicle 16 as well as pivot points for the pivotal portion 24 of the soft panel top assembly 12. Each door rail 28 has a plurality of clamping surfaces (FIG. 6), including, at least one pair of clamping surfaces 30 forming an upper surface extending inwardly over the top of the sport bar 20 and a bottom surface extending inwardly under the bottom of the sport bar 20. The pair of clamping surfaces 30 attach the front portion of the door rails 28 to the vehicle 16 using threaded mushroom knob fasteners 32 extending through the pair of the clamping surfaces 30 with the sport bar 20 sandwiched therebetween. Another of plurality of clamping surfaces is a rear clamping surface 31 extending inwardly under the bottom of the sport bar 20 to attach the rear portion of the door rails 28 to the vehicle 16 using threaded knob fasteners extending through the rear clamping surface 31 and rear header, as will be explained in greater detail below, with the sport bar 20 sandwiched therebetween.

At least one bracket 34 is fixedly connected by fasteners to both of the two door rails 28 to pivotably connect the pivotable portion 24 to the door rails 28. The brackets 34 provide at least a forward pivot point 36 and rearward pivot point 37 for the pivotal portion 24 of the soft panel top assembly 12.

The pivotal portion 24 of the soft panel top assembly 12 has two side rail linkage assemblies generally shown at 38 (FIG. 10), each including the bracket 34, a first link 40, a second link 42 and a third link 44. The first link 40 is fixedly connected to a header 46 or first bow member. The other end of the first link 40 is pivotably connected to the bracket 34 at the forward pivot point 36. The second link 42 is pivotably connected to the first link 40 at a third pivot point 48. The other end of the second link 42 is pivotably connected to the third link 44 at a fourth pivot point 50. The third link 44 is also pivotably connected to the bracket 34 at the rearward pivot point 37.

A bushing and screw arrangement 52 provides for all of the respective pivotal connections such that the side rail linkage assemblies 38 freely pivot to allow the top to be cycled open or closed. However, alternative pivot joint mechanisms can be used without departing from the scope of the invention depending on the particular application.

Figure 12:
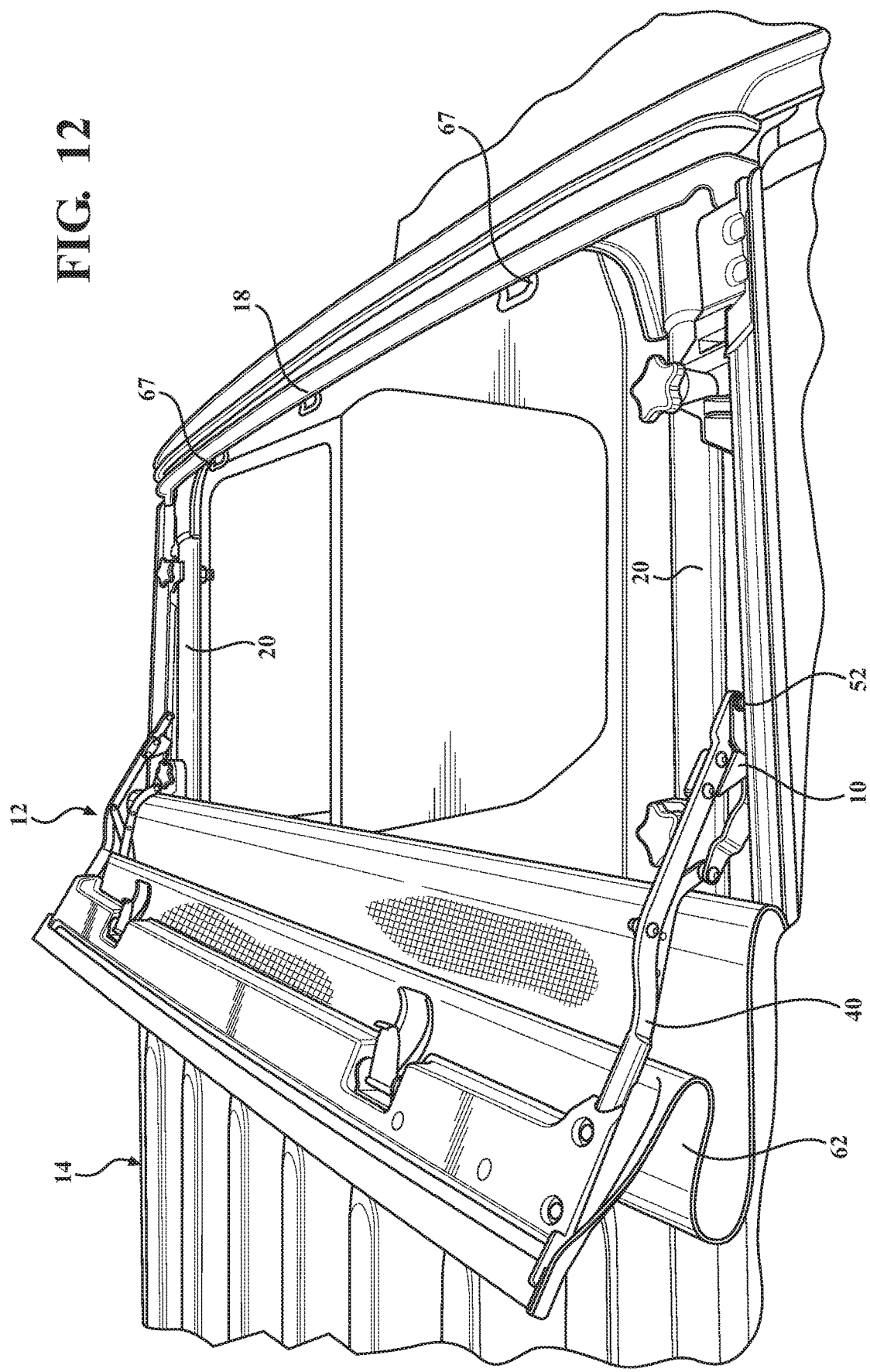
FIG. 12 is a perspective view of the soft panel top cover assembly in an open position.
Figure 13:
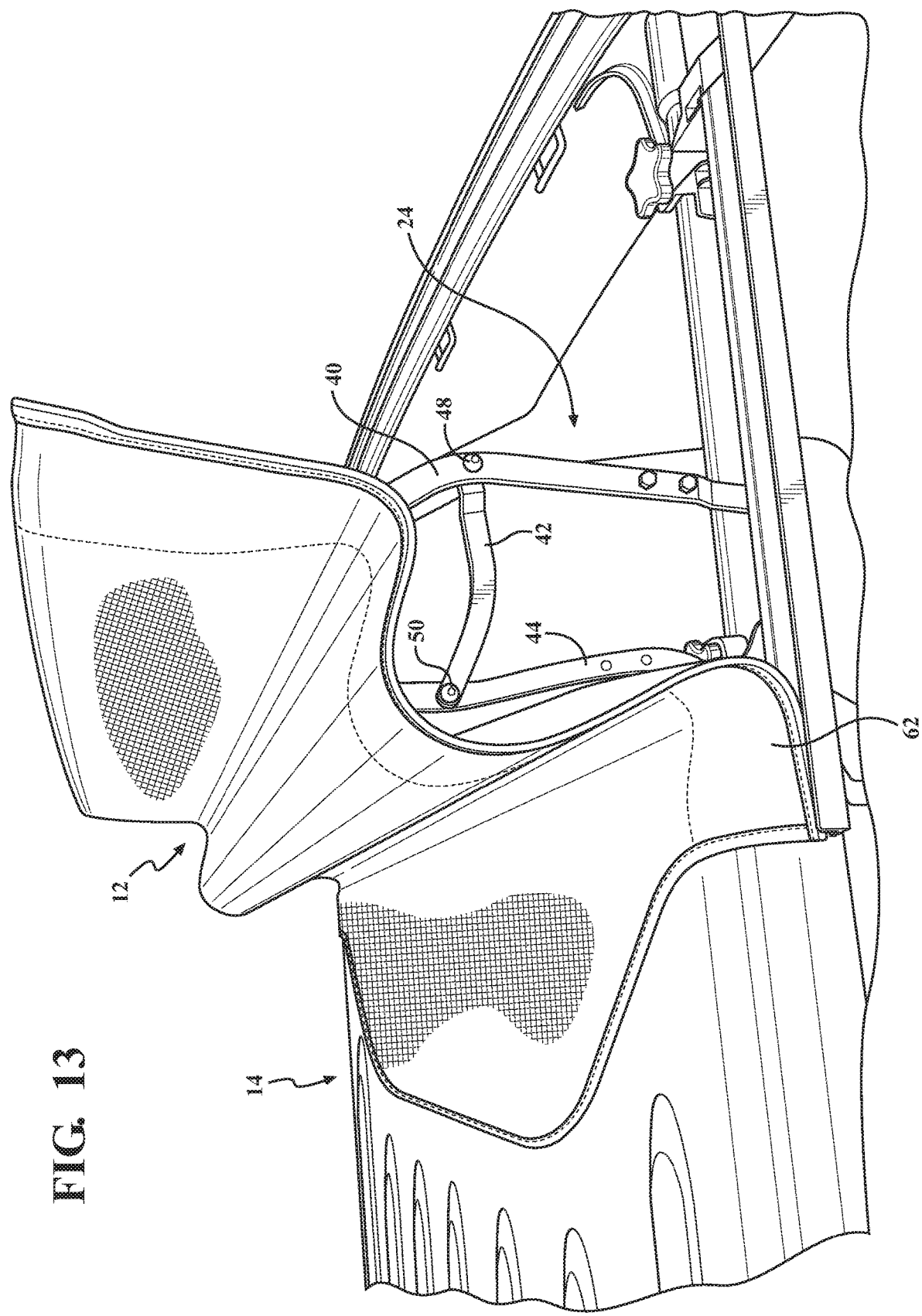
FIG. 13 is a perspective view of the soft panel top cover assembly showing the pivotable portion in a partially open position.
Figure 14:
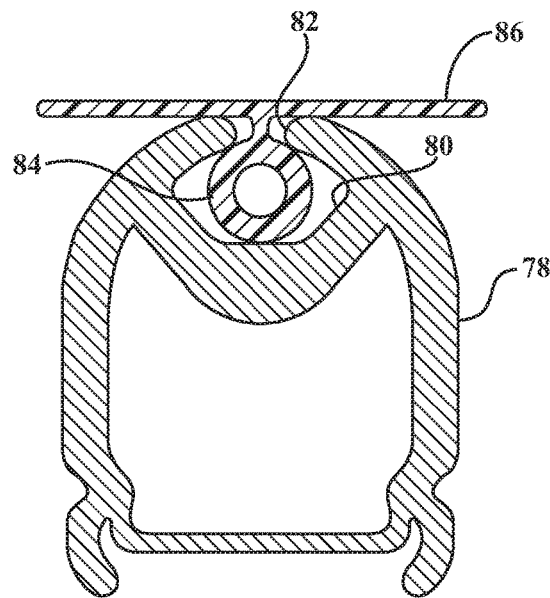
FIG. 14 is a side elevation of a fabric management bow.

The pivotable portion 24 also has a first fabric management bow 54 fixedly connected to the third links 44 by a plurality of fasteners 56. The soft panel top assembly 12 is also provided with a second fabric management bow 58 fixedly connected to a rear header portion 60. The second fabric management bow 58 does not move with opening/closing of the assembly 12. Rather, the second bow 58 is operably connected with fasteners, e.g. bolted, in sockets or recesses formed in the rear header 60. The first and second management bows 54, 58 extend in the cross car position. The combination of linkage assemblies 38 with the fabric management bows 54, 58 manages the top cover 62 as the soft panel top assembly 12 folds to the open position, which is yet another significant advantage (FIGS. 12-13). The fabric management bows 54, 58 also minimize fabric movement in the closed position, which will act to alleviate wind flap noise, in addition to managing fabric during operation and in the open position.

Preferably, the ends of the first link 40 of the side rail linkage assemblies 38 extend into the first bow member 46 and are secured thereto with a second fastener 64. At least one fastener 64 is used which in this embodiment is a nut and bolt combination, but it is within the scope of the invention that other fasteners, such as rivets, may be used as well.

The first bow 46 is adapted for releasable attachment to the windshield frame 18 for opening and closing the soft panel top assembly 12. The first bow 46 has at least attachment mechanisms 66, e.g., latches or other suitable attachment mechanism, connected thereto that have a hand actuated clamping arrangement to selectively connect to the windshield frame 18. The first bow 46 is preferably molded plastic with steel reinforcement on the bottom and comprises two attachment mechanisms 66, most preferably, latches, which when in the closed position attach to opposing features, e.g., metal loops 67, generally located under the visors of the vehicle, and when cycling to the open position, travel with the first bow 46. The attachment mechanisms 66 provide for securing closure of the top to the existing windshield frame 18 and are readily released by an operator for opening of the soft panel top assembly 12.

In accordance with a preferred embodiment, the third link 44 has at least one first curved portion generally indicated at 68 (FIG. 10), and, the first link 40 has at least one second curved portion generally indicated at 70. Generally, the bracket 34 has at least one raised portion generally indicated at 72 to position the rearward pivot point 37 at a predetermined height. The linkage assemblies 38 also include the limiting stop 10 feature operable to keep the soft panel top assembly 12 a predetermined distance away from the hard top 14. The combination of the linkage assembly 38 geometry, link geometries, and limiting stops 10 coordinate to provide the height needed for the pivotal portion 24 to lay above and near the hard top portion 14 without touching the top 14 when in the open position. Thus, there is a predetermined clearance generally shown at "A" between the linkage assembly 38 and the hard top portion 14 and a predetermined clearance indicated generally at "B" between the third link 44 and hard top portion 14 to prevent scratches or damage.

The limiting stop 10 is generally triangular, e.g., generally a right-angle triangle shape and/or scalene triangle, and is connected to the first link 40 for movement with the first link 40 between a stowed stop condition (FIG. 10) and deployed stop condition (FIG. 11) where a vertex of the limiting top 10 contacts the fixed bracket 34 to hold the first link 40 at an angle for keeping the pivotal portion 24 off the surface of the hard top portion 14.

The first fabric management bow 54 is connected to an inwardly projecting attachment portion 74 of the first link 40 by the plurality of fasteners 56. The fasteners used in this embodiment are a nut and bolt combination, but it is within the scope of the invention that other fasteners, such as rivets, may be used as well. The top cover 62 is connected to the first fabric management bow 54. In accordance with one embodiment, the first fabric management bow 54 is a round bow that slides into a pocket sewed into the top cover 48. In accordance with another embodiment, an extrusion is stitched or sewn onto the top cover 48.

In accordance with a preferred embodiment the first fabric management bow 54 and second fabric management bow 58 have a channel 76 (FIG. 10) along the length of the bows 54, 58 that is open on at least one end to receive an extrusion. The extrusion is connected to the top cover 62, e.g., bonded or adhered thereto with adhesive, and/or sewn, etc, and the extrusion is slid into the channel 76. The channel 76 is generally circular in cross section, or any other alternative cross sections suitable for attaching the cover 62 to the bows 54, 58.

Figure 15:
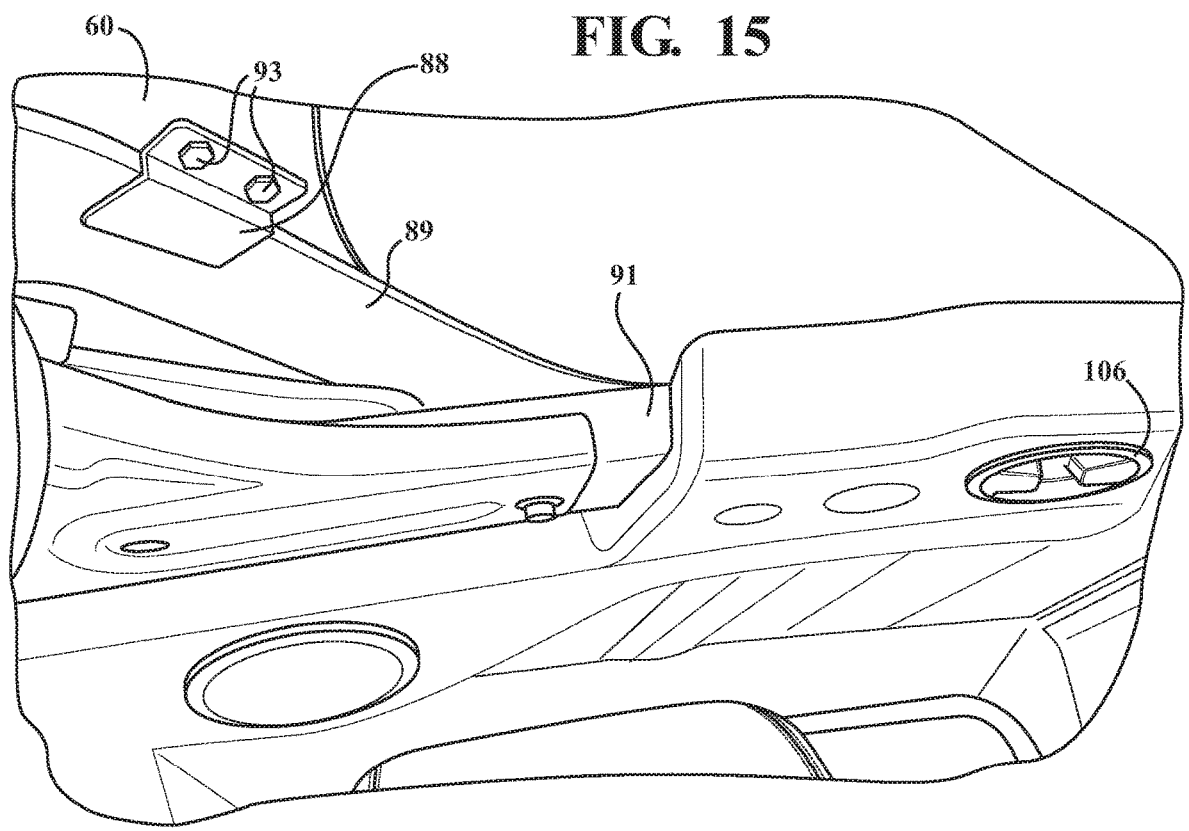
FIG. 15 is a perspective view of an attachment bracket coupled to a hardtop flange and a rear header of the soft panel top cover assembly.
Figure 16:
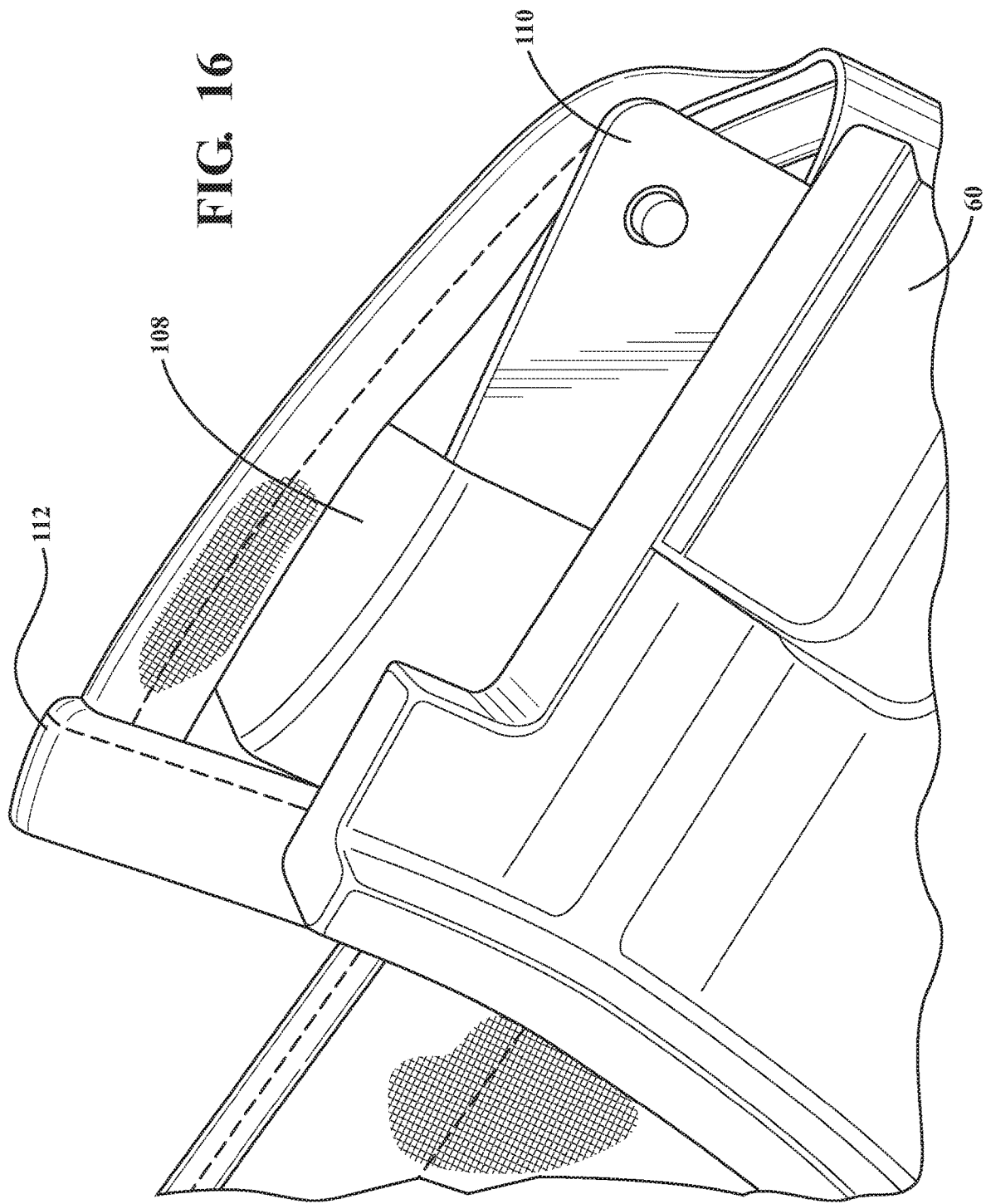
FIG. 16 is a perspective view of the cover coupled to the rear header, in accordance with an embodiment of the present invention.
Figure 17:
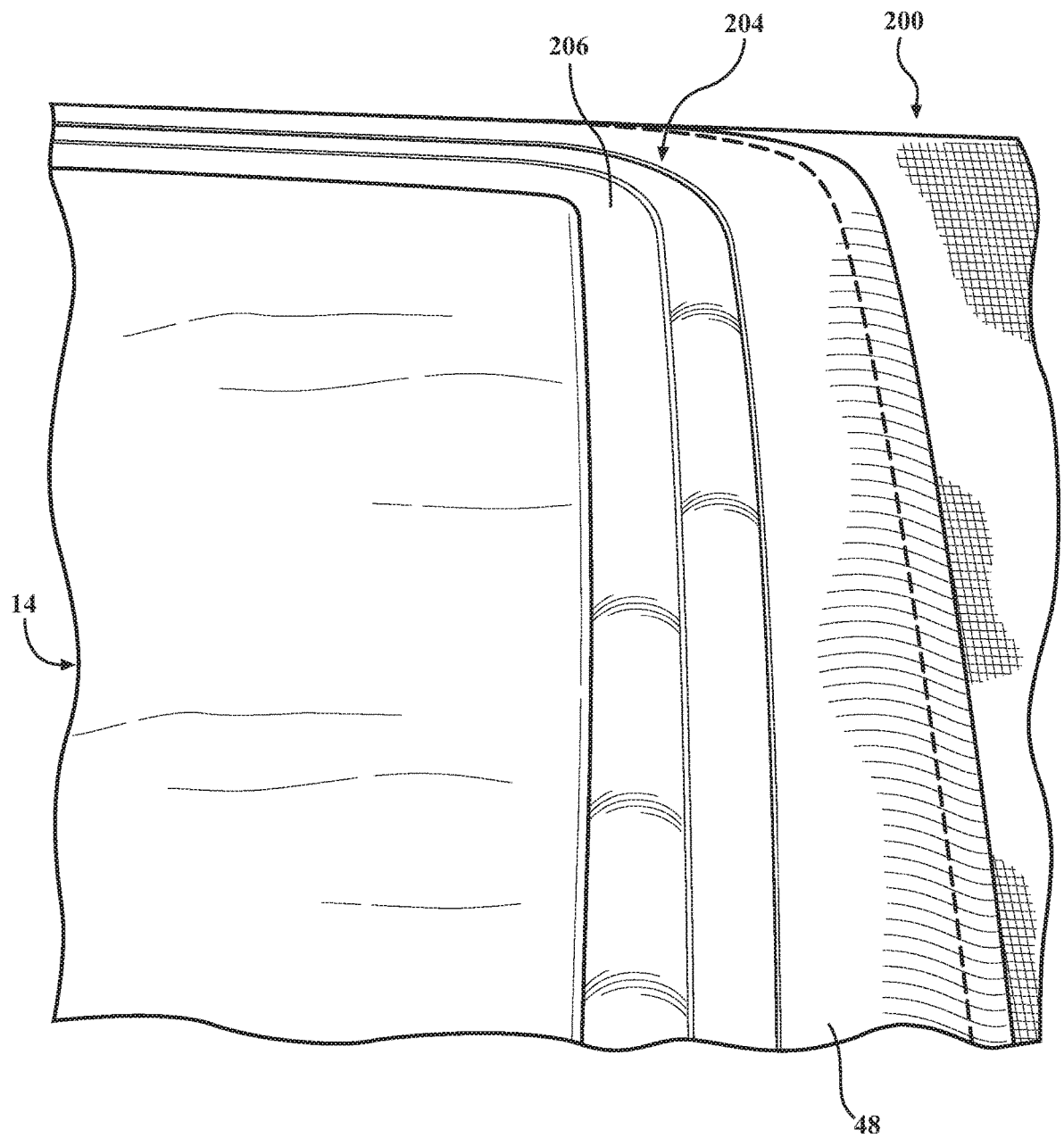
FIG. 17 is a perspective view of a portion of a soft panel top cover assembly that is connected to the vehicle having a bulb seal in sealing engagement with a hardtop portion, in accordance with another embodiment of the present invention.
Figure 18:
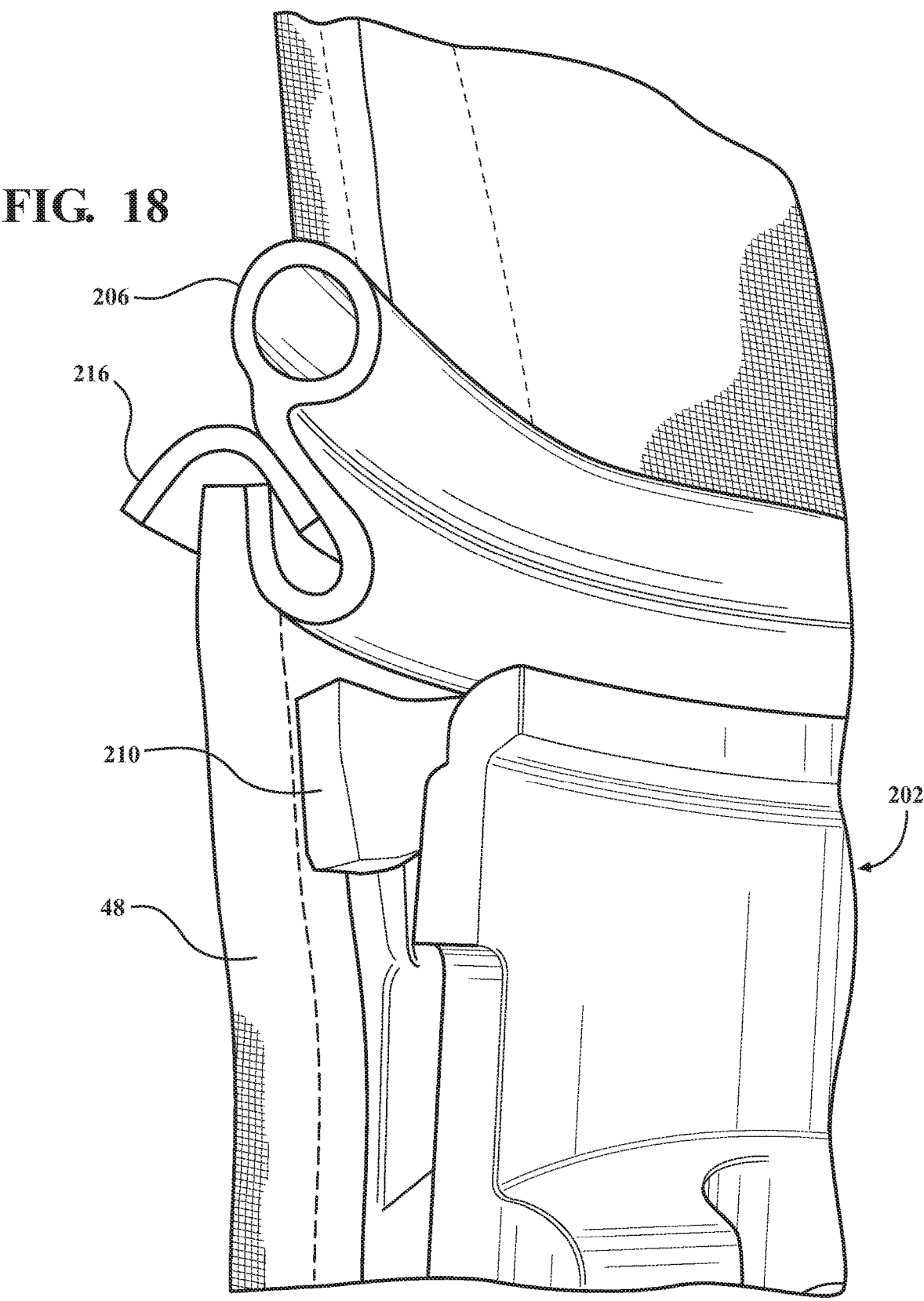
FIG. 18 is a bottom perspective view of a rear header assembly connected to a soft top cover of the soft panel top cover assembly and depicting the bulb seal of FIG. 17 and a tertiary seal, in accordance with the present invention.

A first fabric management bow 78 having a preferred channel 80 cross section is illustrated in FIG. 15 according to another embodiment. The extrusion includes a larger portion 84, e.g., larger diameter bulbous portion, received within an inner chamber of the channel 80 such that the extrusion 84 cannot work its way out laterally through a smaller opening 82 of the channel 80. At least one, preferably two, flanges 86 generally extend from the larger bulbous portion for attachment to the top cover 62, e.g., bonded or adhered thereto with adhesive, and/or sewn. After the cover 62 is attached the extrusion 84 is slid into the channel 80 along the length of the channel 80 and the first fabric management bow 78 is then connected to the attachment portion 74 of the first link 40 and the plurality of fasteners 56 applied. The second fabric management bow 58 is identical in this embodiment to the first fabric management bow 78.

Depending on the application the extruded materials are generally polypropylene, polyethylene, flexible polyvinyl chloride, structural acrylonitrile butadiene styrene, thermoplastic elastomer of operable densities or other material suitable for making the extrusion (bulb portion and attachment flange). If more than one extruded material is used the extruded materials are compatible materials to melt bond to one another under pressure depending on the application.

The rear header 60 has a plurality of attachment features for coupling to the sports bars 20, cross member 91, and hard top cover portion 14. At least two locating brackets 88 are connected to the bottom of the rear header 60 by at least two fasteners 93 (FIG. 15). The locating brackets 88 interface with the hardtop 14. In particular, the locating brackets 88 have a portion that fits under a portion of the existing hardtop structure at the leading edge flange 89 toward the corners.

At least two feet 90 are integrally formed with the bottom of the rear header 60 and rest on top of the cross member 91. The feet 90 include a locating lip 92 that hangs over the front edge of the cross member 91 generally toward the center of the vehicle. These feet 90 generally set the height with the hardtop 14.

The rear header 60 also includes two attachment members 94 that are integrally formed with the header and attached to the top of opposing sport bars 20 by second mushroom knobs 96. The first and second mushroom knobs 32, 96 are most preferably the same type of knob and interchangeable. The two attachment members 94 are a predetermined length and can be longer or shorter without departing from the scope of the present invention.

Thus, the rear header 60 is operably attached to the sports bars in two locations on the cross member 91, in two locations (1 per side) on the fore/aft sport bars 20, and interfaces with the hardtop 14 using the two locating brackets 88. No modification to the hardtop 14, no drilling of any holes, or changing of any existing components is required. The manufactures front cockpit panels are removed and the soft panel top assembly 12 is installed. In a preferred embodiment, the soft panel top assembly 12 ships as a module except that the two locating brackets 88 are connected to the underside of the rear header 60 and extends to under the hardtop 14 leading edge flange. Alternatively, the brackets 88 are also shipped attached. The process for installation of the soft panel top assembly 12 includes removing existing top and then aligning the clamping surfaces 30 of the two door rails 28 with the sport bars 20 adjacent apertures for the mushroom knobs 32, aligning the attachment members 94 of the rear header 60 on top of the sports bars 20 adjacent apertures for the second mushroom knobs 96, and/or resting the two feet 90 of the rear header 60 on top of the cross member 91. The threaded mushroom knobs 32, 96 are turned to attach the soft panel top assembly 12 to the sport bars 20. The two locating brackets 88 are positioned along the leading edge flange 89 and bolted to the underside of the rear header 60 using pre-drilled holes in the rear header 88. At least two threaded fasteners 106 extend from the bottom of the cross member 91 and/or speaker bar into pre-drilled holes on the underside of the rear header. The knobs clamp against the respective surfaces and have a pin portion extending into the respective components. As the respective knobs are tightened and screwed into the cross member 91 and sports bars 20 of the vehicle 16, the knobs connect the assembly 12 to the vehicle and also press the rear header 60 against the hard top cover seal 26

The rear header 60 is a rear header closeout operable to engage at least one seal existing on the hard top portion 14 to provide a weatherproof seal under compression, e.g., bulb seal, gasket or other suitable seal to prevent leaks between the hard top portion 14 and assembly 12. It is within the scope of the invention to manufacture the rear header 60 as a wireframe (e.g., bent wire frame welded together), lightweight molded plastic, or other suitable lightweight material and configurations and/or combinations thereof suitable to withstand predetermined strength requirements and to sealingly engage with the hard top portion 14, depending on the particular application without departing from the scope of the invention. The rear header 60 is a single piece or plurality of pieces. Most preferably, the rear header 60 has three lightweight molded pieces operably connected together.

In a preferred embodiment, a plastic retainer 108 slides over a metal backing 110 piece connected by a fastener to keep the cover 62 connected on the rear header 60, e.g., the cover is sandwiched. Similarly, the front header 46 has a similar metal backing and plastic retainer connecting the cover 62 to the header 46, e.g., the cover is sandwiched. The cover is also stitched or sewn 112 along edges. The cover 62 or soft skin or top cover of the soft panel top assembly 12 is fabric. The cover 62 is secured to the rear header 60 and front header 46 without the need for snaps.

Most preferably, the seal 26 of the hard top portion 14 is a bulb seal. The seal 26 generally follows the contour toward the front of the hard top portion 14, e.g., a forward projecting stepped portion of the hard top with the seal operably attached along a top surface thereof. The rear header 60 geometry generally follows the hard top portion 14 contours and seals against the hardtop's bulb seal 26.

The soft panel top cover assembly 12 also has a cable assembly 98 located on both side that are fore/aft cables to provide tension along the sides of the fabric (FIG. 9). The cable 98 is operably connected to the header 46 and also to the rear header 60.

The soft panel top cover assembly 12 also has a plurality of seals. At least two front corner seals 100 (FIG. 5) are operably connected, e.g., with adhesive, toward the forward end of the door rails 28 near a windshield seal. At least two front header seals 104 are operably connected, e.g., with adhesive, near both ends of the header 46. At least two rear corner seals 102 are operably connected, e.g., with adhesive, toward the rearward end of the door rails 28 near the rear header 60 (FIG. 6). Optionally, a lip seal is operably connected to the cover 62 along at least the rear edge surface of the rear header 60. By way of example, the lip seal is sewn and/or bonded to the cover 62 and sandwiched between the cover 62 and rear header 60 at the rear of the assembly 12 near the current hardtop seal 26.

The seals 100, 102, 104 are an open cell foam, a closed cell foam material, EPDM (ethylene propylene diene monomer), TPE (thermoplastic elastomers), TPV (thermoplastic vulcanizate), etc., a foam rubber, an extruded rubber, a formed/molded rubber mucket, and/or a silicone material. The seals 100, 102, 104 are preferably foam seals, most preferably soft sponge EPDM closed cell foam. Alternatively, at least one of the pairs of seals 100, 201, 104 are a rubber mucket which is more robust.

The left half of the soft panel top cover assembly 12 and corresponding features are substantially mirror image/symmetrical to the right half of the soft panel top cover assembly 12 and corresponding features depicted in the figures.

Referring now to FIGS. 17-25, in accordance with another embodiment of the present invention, there is provided a soft panel top assembly 200 similar to the soft panel top assembly 12 in FIGS. 1-16 (e.g., is connected to the vehicle 16, is foldable and sealable with the hard top roof portion 14, and includes the pivotable portion 24 with the two side rail linkage assemblies 38 and fabric management bows 54, 58, the two door rails 28 and the front header 46, etc.). However, the rear header of the soft panel top assembly 200 additionally includes at least one seal, preferably, a sealing system or arrangement with multiple seals. In addition, the soft panel top assembly 200 has a lightweight rear header portion that is a single piece or a plurality of pieces operably connected together.

The soft panel top assembly 200 includes a rear header assembly shown generally at 202 having a sealing system indicated generally at 204 to prevent leaks between the hard top portion 14 and assembly 200. The sealing system 204 includes at least one rear header seal 206, which seals in cooperation with the existing at least one hard top seal 208 on the hard top portion 14. At least one tertiary seal 210 is also provided. The tertiary seal 210 is preferably a continuous strip that runs the length of the rear header 202.

The hard top seal 208 is typically a triangular bulb seal, however, any other seal is contemplated. It is also contemplated that the present invention includes at least one additional seal, e.g., bulbous seal(s), applied to the hard top portion 14 prior to installation of the rear header assembly 202.

The rear header seal 206 is connected to an upper rear header 212 of the rear header assembly 202. The rear header seal 206 is a bulb seal, living hinge seal, and any other seal suitable for sealing engagement with the hard top roof portion 14. At least one retainer 214 is operably connected to the inside rear edge of the soft top cover 48 of the assembly 200 and is located against the inner surface of the upper rear header 212. A portion of the retainer 214 projects rearward to receive at least one binding retainer 216 or binding, generally having a C-shape or U-shape, along the edge of the retainer 214. An attachment portion shown generally at 218 of the rear header seal 206 is held between the retainer 214 and the binding 216. A sealing portion shown generally at 220, preferably a bulb portion, of the rear header seal 206 becomes sandwiched between and seals against a surface 222 of the hard top portion 14 and the binding edge 224.

Most preferably, the retainer 214, binding 216 and rear header seal 206 are continuous parts that generally run the cross car length of the rear header assembly 202 and generally follow the contour of the rear edge of the rear header upper 212. The rear header assembly 202 geometry generally follows the contours of and seals against the hard top portion 14.

Figure 20:
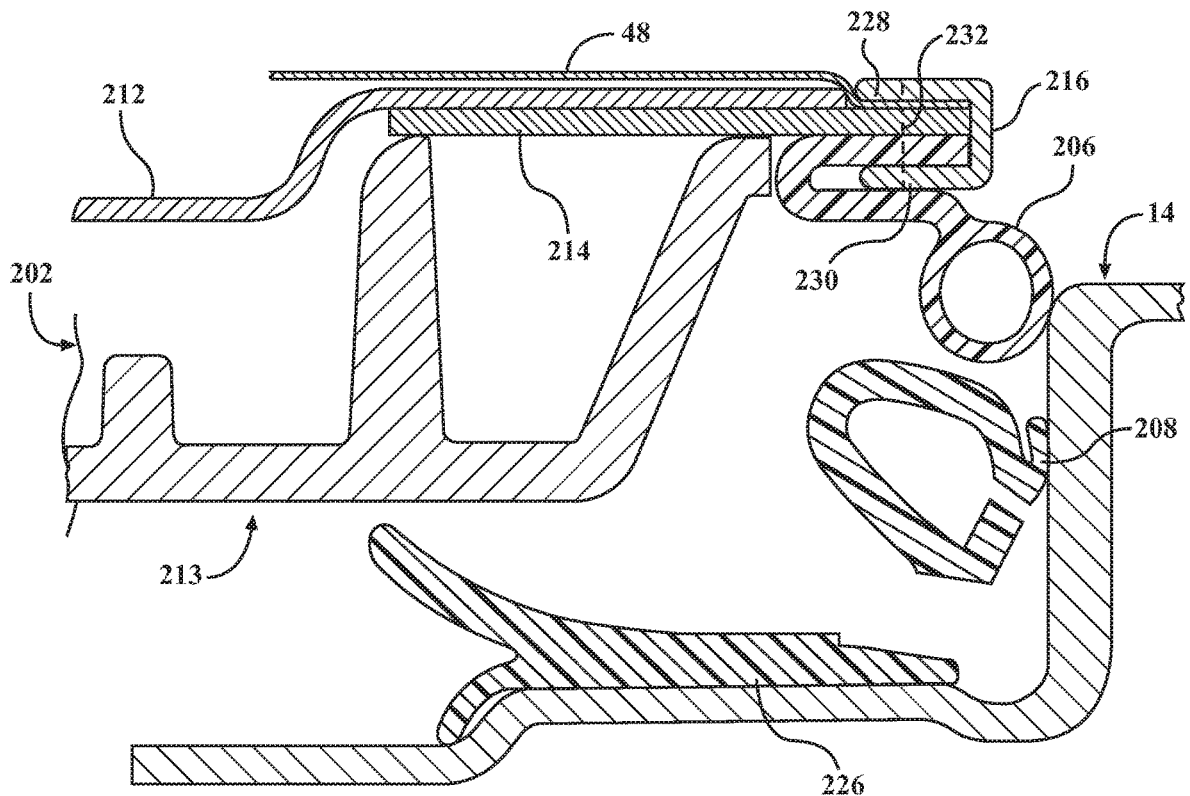
FIG. 20 is a cross sectional view of the rear header assembly of the soft panel top cover assembly depicting the hard top cover seal and bulb seal prior to compression, in accordance with the present invention.
Figure 21:
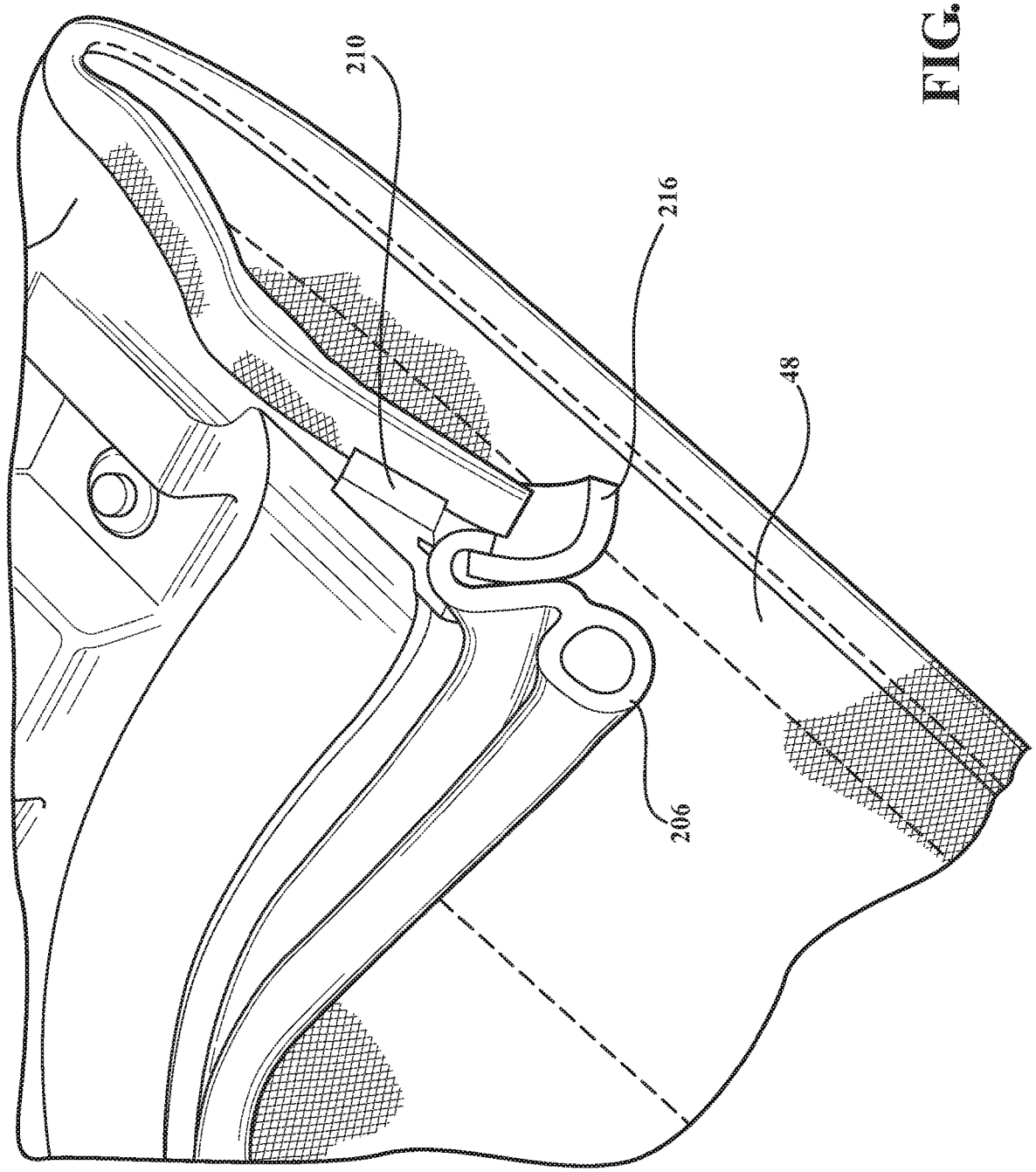
FIG. 21 is a bottom perspective view of the rear header assembly connected to the fabric cover, in accordance with the present invention.

FIG. 20 illustrates a cross sectional view depicting the sealing system 204 before installation of the rear header assembly 202, thus, prior to compression of the hard top seal 208 and at least one other hard top seal 226 by the rear header assembly 202. The top 228 of the binding 216, cover 48 material, retainer 214, rear header seal 206 and the lower section 230 of the binding 216 that sandwiches the components together is depicted. The rear header seal 206 can additionally, or alternatively, be bonded or attached with adhesive, and/or other suitable attachment method without departure from the scope of the present invention. A plurality of fasteners is also contemplated. FIG. 20 also depicts an alternative attachment method where the top and bottom of the binding 228,230, attachment portion of the seal 206 within the binding 216, retainer 214 and cover 48 are sewn together 232. In a preferred embodiment, the rear header seal 206 is held in the desired positions by being sandwiched between parts and with adhesive.

Figure 19:
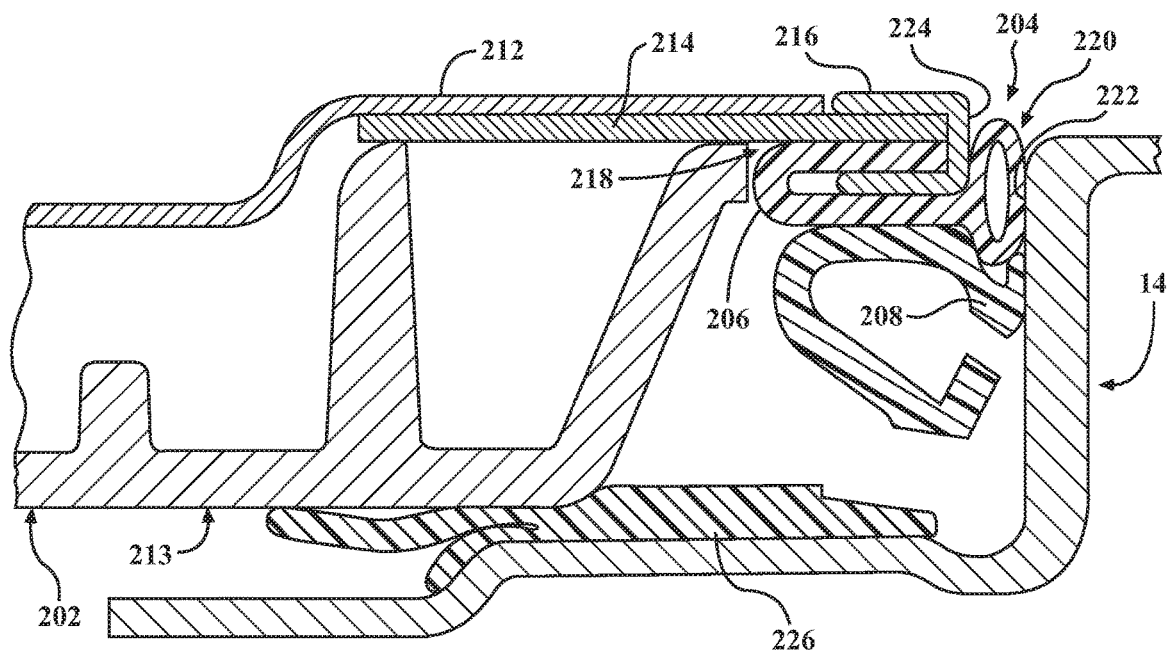
FIG. 19 is a cross sectional view of the rear header assembly of the soft panel top cover assembly in an installed position on the vehicle, with the top cover omitted for clarity, depicting a hard top cover seal of the hard top portion compressed and the bulb seal in a sealing position, in accordance with the present invention.

FIG. 19 illustrates a cross sectional view depicting the sealing system 204 sealing the soft panel top assembly 200 to the hard top portion 14. When the rear header assembly 202 is installed to the vehicle 16 the hard top seal 226, e.g., flange seal, on the hard top portion 14 is compressed by a bottom surface on a rear header lower 213 of the rear header assembly 202. The rear header lower and upper 212,213 are preferably integrally formed. In addition, when the rear header assembly 202 is installed to the vehicle 16 the hard top seal 208, e.g., triangular bulb seal, on the hard top portion 14 is compressed by the rear header assembly 202 which pushes the sealing portion 220, e.g., bulb, of the rear header seal 206 upward between the binding 216 and the hardtop. Thus, once compressed, the sealing portion 220 is in contact with the hardtop surface 222, which is generally a vertical surface, and in contact with the binding edge 224, which is generally a vertical surface, as well as in contact with the hard top seal 208.

The existing hard top seal 208 is rubber. At least the sealing portion 220 of the rear header seal 206 of the present invention is generally less stiff than the hard top seal 208. The rear header seal 206 has a predetermined durometer for meeting the desired sealing with requirements. Having a first durometer, e.g., of a higher durometer, for the attachment portion 218 and a second durometer, e.g., of a lower durometer, for the sealing portion 220 is contemplated without departing from the scope of the present invention.

Generally, the rear header seal 206 is an open cell foam, a closed cell foam material, such as, but not limited to, EPDM, TPE, TPV, etc., a foam rubber, an extruded rubber, a formed/molded rubber mucket, and/or a silicone material. Preferably, the rear header seal 206 is a closed cell foam material. The tertiary seal 210 preferably uses similar material.

The left half of the soft panel top cover assembly 200 and corresponding features are substantially mirror image/symmetrical to the right half of the soft panel top cover assembly 200 and corresponding features depicted in the figures.

The rear header assembly 202 includes a rear header portion 234 that is a single piece or plurality of pieces. The rear header portion 234 is a lightweight header including a wireframe (e.g., bent wire frame welded together), lightweight molded plastic, or other suitable lightweight material and configurations and/or combinations thereof depending on the particular application. Preferably, the rear header portion 234 is three to five pieces, e.g., molded segments, operably connected together. Most preferably, the rear header portion 234 has three lightweight molded pieces operably connected together.

Figure 22:
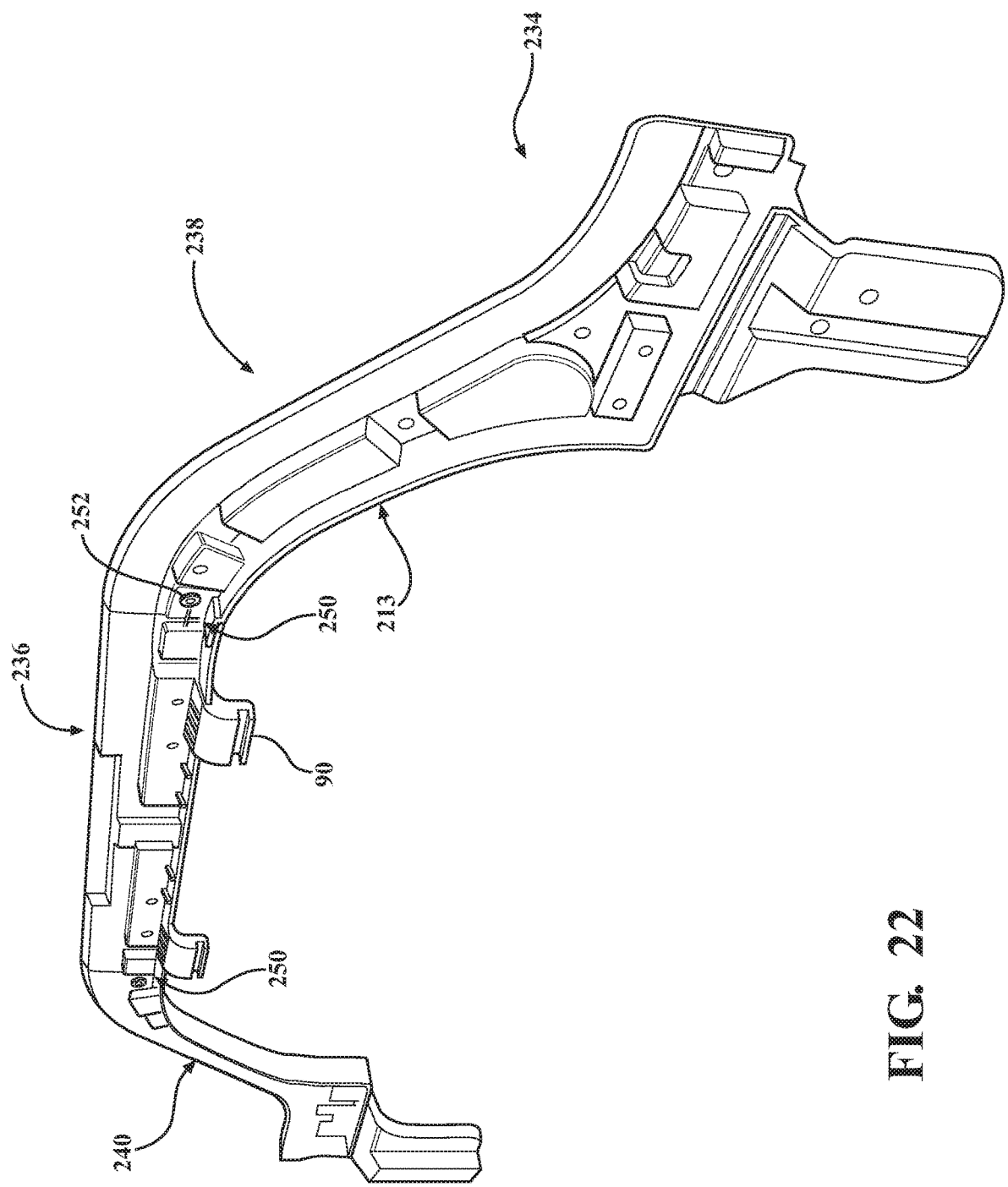
FIG. 22 is a bottom perspective view of a rear header portion of the rear header assembly comprising three segments connected together, in accordance with the present invention.
Figure 23:
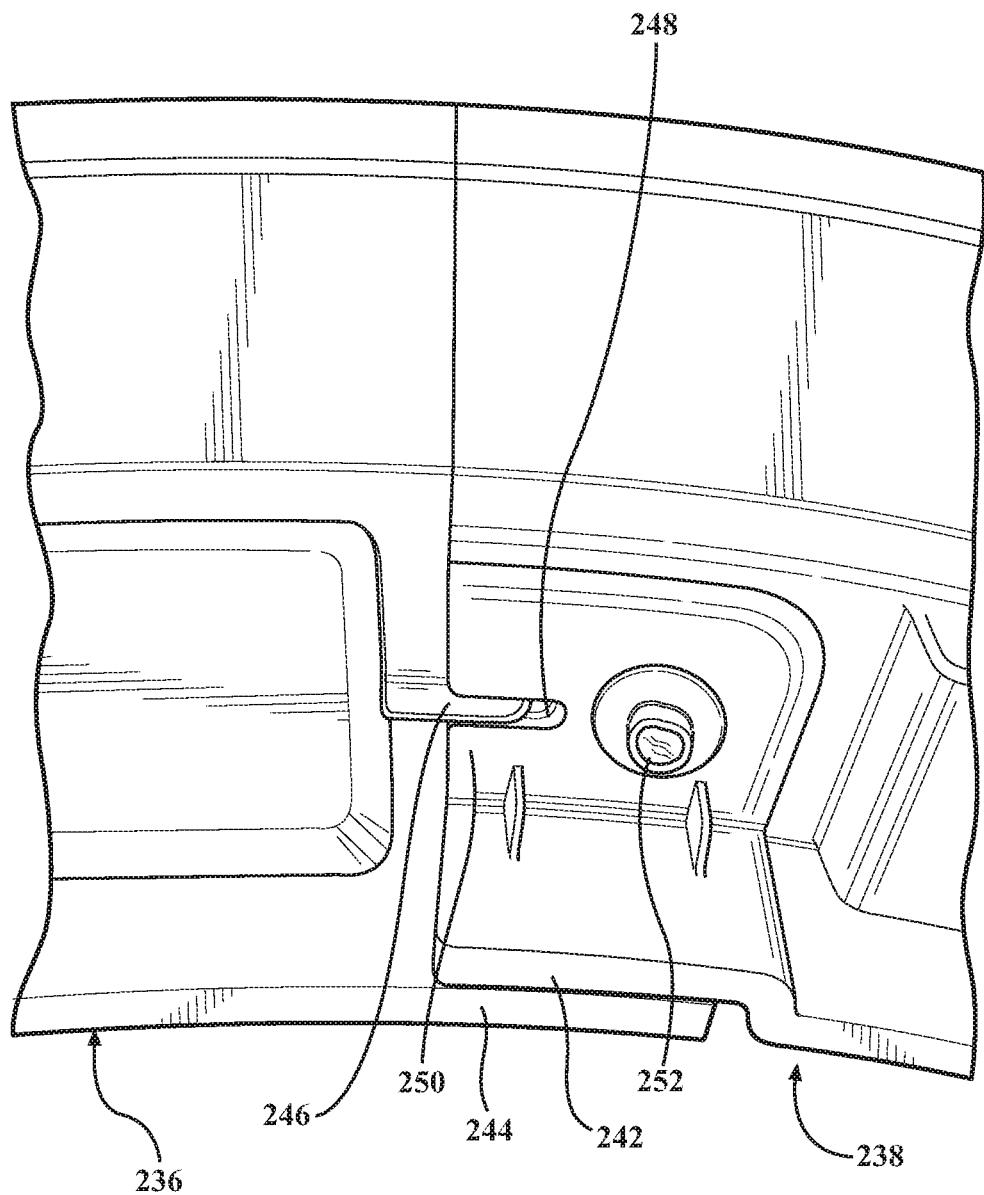
FIG. 23 is a bottom perspective view of a first outer segment of the rear header portion connected to a center segment of the rear header portion, in accordance with the present invention.
Figure 24:
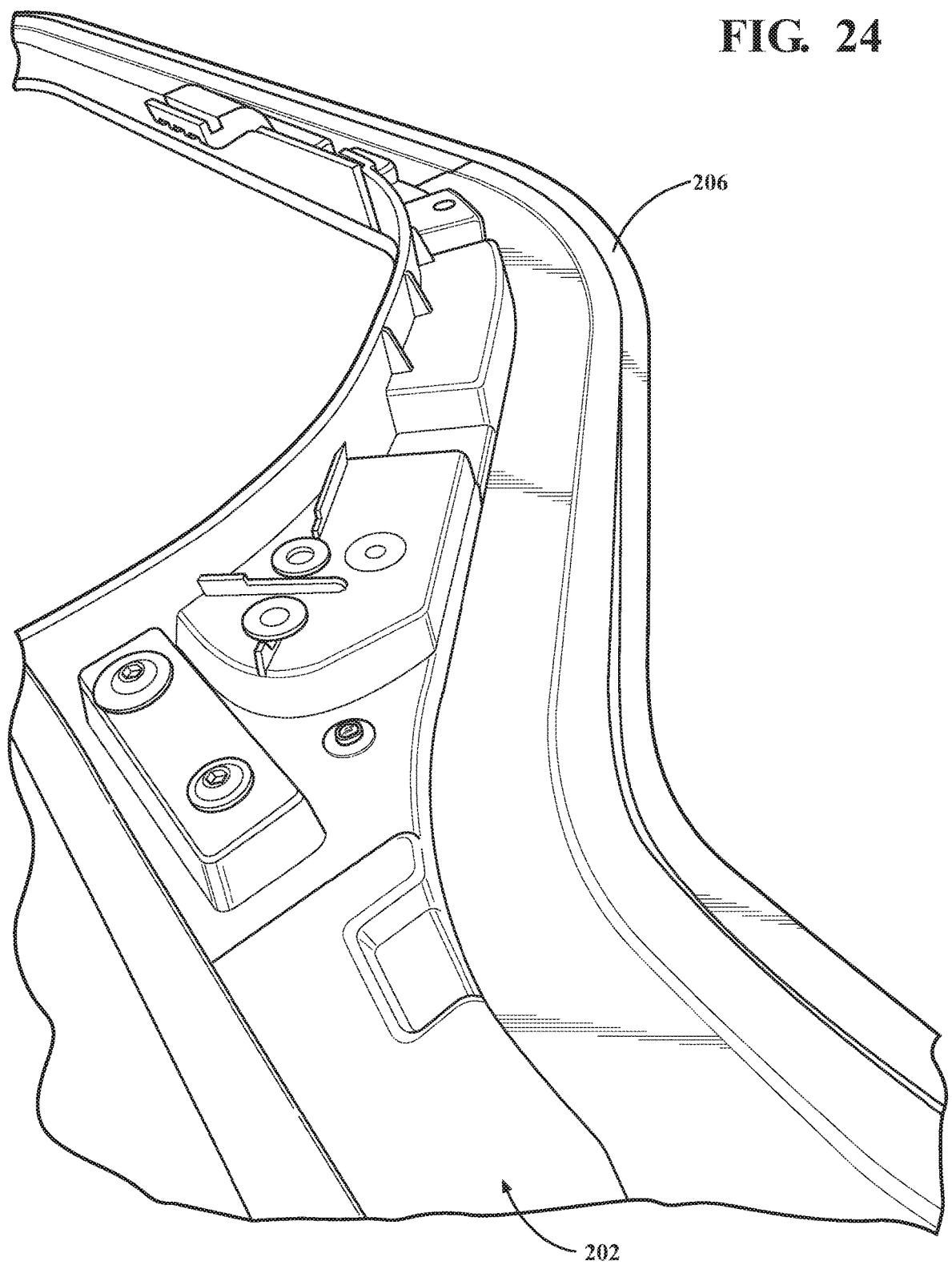
FIG. 24 is a bottom perspective view of the rear header portion, in accordance with the present invention.

Referring to FIGS. 22-24, there is depicted a rear header portion 234 that is a 3-piece header, according to an embodiment of the present invention. A center segment 236, first outer segment 238 and a second outer segment 240 are provided. The first and second outer segments 238 and 240 are operably connected toward the ends of the center segment 236. It is understood that more or less than three segments are contemplated depending on the application without departing from the scope of the present invention. The rear header portion 234 is a single unit or any plurality of parts that combine to make the rear header.

Referring more particularly to FIG. 23, the end 242 of the first outer segment 238 overlaps the end 244 of the center segment 236. A rib 246 is also received in a slot 248, e.g., to allow the overlap and building strength at the area of connection 250. The respective segments are mechanically fastened using at least one fastener 252, e.g., screws, rivets, bolts, or any other suitable fastener to hold the segments together. Alternatively, or additionally, the segments are bonded together or adhesive is used.

Figure 25:
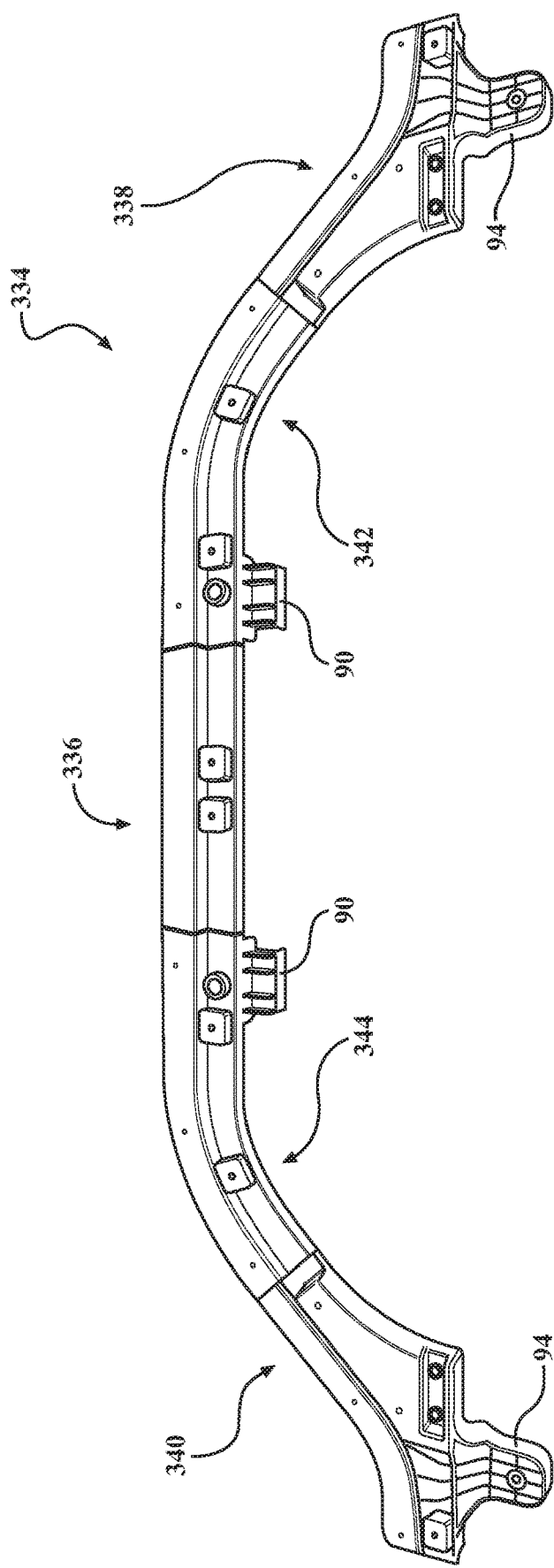
FIG. 25 is a top perspective view of a rear header portion comprising five segments, in accordance with another embodiment of the present invention.

Referring more particularly to FIG. 25, there is depicted a rear header portion 334 that is a 5-piece header, according to another embodiment of the present invention. A center segment 336, first outer segment 338, second outer segment 340, first intermediate segment 342 and second intermediate segment 344. The first and second outer segments 338 and 340 are operably connected toward the outermost ends of the first intermediate 342 and second intermediate segment 344, respectively. The first and second outer segments 342 and 344 are operably connected toward the ends of the center segment 336. The respective segments are mechanically fastened using at least one fastener as described above, e.g., screws, rivets, bolts, or any other suitable fastener to hold the segments together. Alternatively, or additionally, the segments are bonded together or adhesive is used.

It is understood that the present invention is additionally suitable for a two door or four door vehicle.

By utilizing the pivot points attached to the door rails this allows the operator to quickly cycle the top from the closed position to the open sunroof position without removing the top. The operator would then be able to cycle the top from the open position to the closed position and latch the top just as easily. The operator does not need to leave the vehicle in order to operate the top. The whole top is made lightweight by using the rear header (wireframe and/or molded rear header) and by using minimal frame and mostly soft goods. This helps with ease of installation and ease of cycle efforts. The soft panel top assembly enables the occupant to fold the top back to gain an open air experience without removing the top and can mount to the hardtop without modification to the vehicle. The soft panel top assembly has significant benefits over typical removable hard top cockpit panels and does not require modification to the vehicle or hard top roof portion in any way.

Referring to the figures generally, the present invention provides a stowable soft top assembly or "soft panel top cover assembly" or "assembly" (used interchangeably herein).

In general, FIGS. 26-34 and 39 depict front top assemblies, and FIGS. 35-38 depict attachment arrangements that can be incorporated therewith. The tops are operably connectable to the vehicle. The vehicle includes a windshield frame with side members, e.g., sport bars, extending generally therefrom and a cross bar or cross member operably connecting the side members generally adjacent the rear of the driver/passenger compartment.

Figure 26:
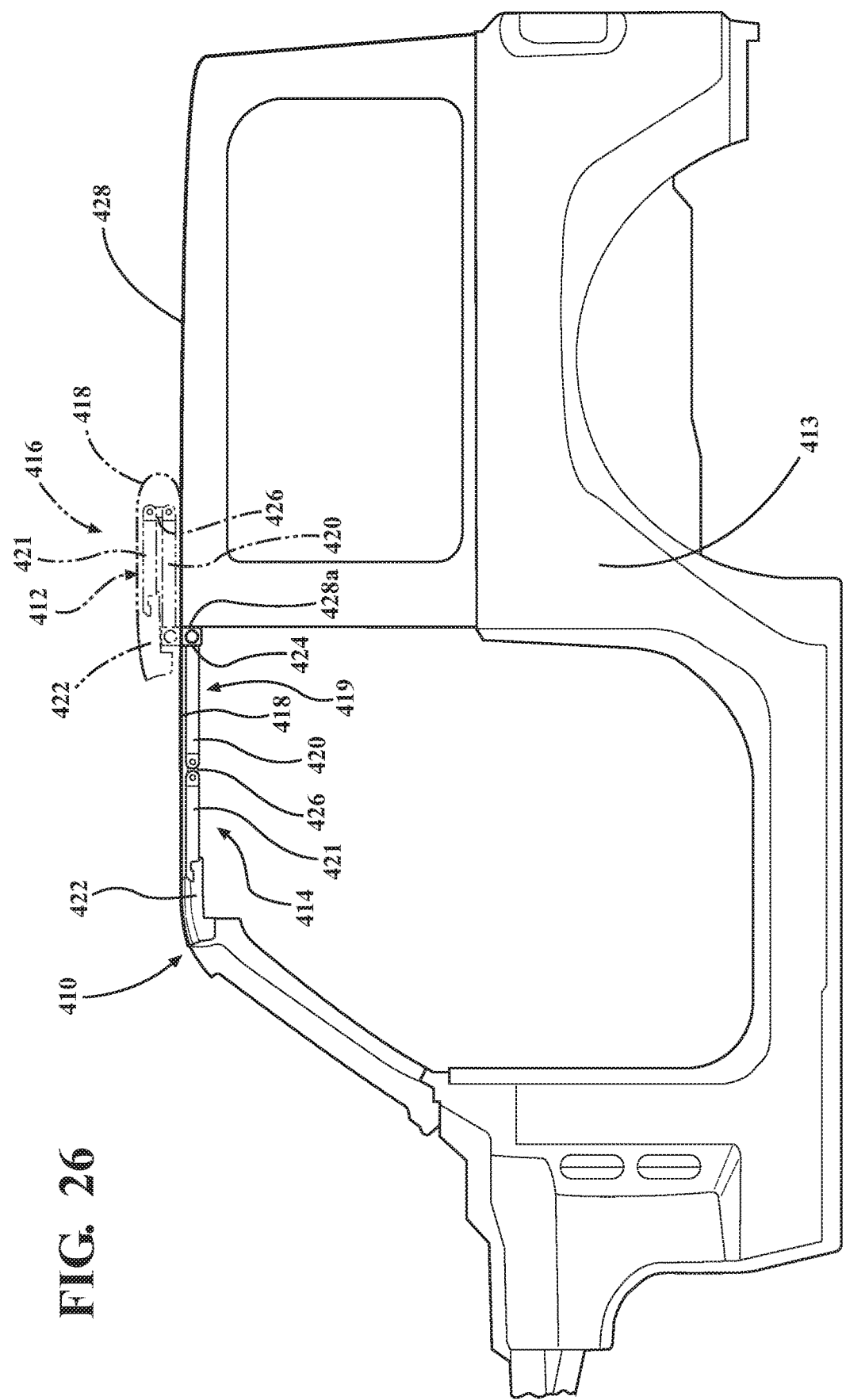
FIG. 26 is a side elevation view of a soft panel top cover assembly shown in an open position connected to a 2-door vehicle, in accordance with a first embodiment of the present invention.

FIG. 26 depicts a soft top assembly 410 according to one embodiment of the present invention including an articulating portion shown generally at 412, forming a sunroof portion, that includes a cover 418 that is a soft top moveable between a closed position and at least one open position, said assembly 410 operably connected to the vehicle 413 and operably sealable against a hard top 428 toward a leading sealing surface 428a. By way of non-limiting example, the cover 418 is mat-like. The closed position, indicated generally at 414, closes off the occupant compartment. The open position, indicated generally at 416 (in phantom), exposes the compartment providing the open air feel. The cover 418 is operably coupled to a frame, shown generally at 419, to move between the closed/open positions. The frame 419 includes at least a rear link 420 pivotally connected to a front link 421. Additional linkages and linkage assemblies are contemplated depending on the application without departure from the scope of the present invention. The links 420,421 form articulating door rail segments, according to an aspect of the present invention. These door rail segments act as both linkages for articulation of the sunroof portion 412 and as sealing surface for the vehicle doors and/or top deck.

The cover 418 and the front link 421 are operably coupled to a front header 422 connectable to a windshield frame area when in the closed position, where the front header 422 travels with the sunroof portion to the open position 416. At least one hinged pivot point 424 is provided, preferably toward the rear of the sunroof portion generally adjacent the leading edge of the hardtop 428a, for flipping the unit back and out of the way. While the assembly 410 is depicted on the top of the hard top 428 with the frame 419 generally horizontal, it is understood that at least one stop or other suitable feature can be incorporated into the assembly 410 to set the predetermined allowed range of motion to the open position relative to the hard top 428.

The assembly 410 is operably connected to the vehicle 413, e.g., such as to the side sports bar(s) and/or cross car member, and/or hard top 428, etc. In one aspect of the present invention, a pair of hinged pivot points 424 are provided at joints toward the ends of a rear header or other attachment structure of the assembly 410.

At least one intermediate hinged pivot 426 is provided to operably fold the cover 418, e.g., fold generally in half, partially uncovering the front cockpit. The assembly 410 can also be rotated further, at the first hinge point 424, to the fully open sunroof position. The hinged pivot point 424 is a double hinge point. Alternatively, the hinge point 424 is a single hinge point. In addition, the frame's 419 rear link 420 and front link 421 are pivotally connected at an intermediate double hinge point 426 adjacent to the hard top 428 front edge. Alternatively, the hinge point 426 is a single hinge point.

These hinge points 424, 426 can be single, double or any type of hinge or any other articulating mechanism configured to fold and flip the articulating portion 412 over the leading edge of the hard top 428 and the top 410 is adapted to either rest adjacent to the hard top 428. The hinge points 424 and/or 426 are operably located for moving the assembly 410 between the open and closed positions, e.g., at least one hinge located on both sides of the articulating portion 412, at least one located toward the rear of the articulating portion 412, and/or at least one extending cross car, etc. and/or combinations thereof. More or less hinging points and more or less folds (e.g., generally in half, thirds, etc.) of the cover 418 are contemplated without departure from the present invention. Preferably at least one hinge point is provided on each side. It is also contemplated that the cover 418 could be operably hinged to fold the header 422 under or in the direction toward the back of the vehicle.

Providing at least one fabric management bow, e.g., fixed and/or articulating bow(s), is contemplated without departure from the present invention. Providing at least one linkage assembly incorporated for moving the articulating portion 412 between the open/closed positions is contemplated without departure from the present invention. Providing the frame with at least one door rail, preferably a pair of door rails, and/or rear header is contemplated without departing from the scope of the present invention. Providing at least one lighting device on the assembly 410 is contemplated without departure from the present invention. Providing at least one stop to set a predetermined height of any hardware of the articulating portion 412 in the open sunroof position above the hard top 428 is contemplated without departing from the scope of the present invention. Providing at least one seal is contemplated without departure from the present invention, e.g., front header 422 corner seal(s), side link seal(s), door rail seals, rear header seal(s), articulating portion 412 seal(s), etc. and combinations thereof, e.g., closed cell, rubber, bulb, flange, and/or mucket seal(s). Adapting for sealing engagement with a rear soft top, slanted back top, and any other vehicle top is also contemplated without departure from the present invention. Adapting for use with environment diffusion shade(s) connected over the cockpit is also contemplated without departure from the present invention.

Referring further to FIG. 26, preferably the front header 422 or "1 bow" is released from the windshield header and articulated rearward exposing the front compartment. At least one soft material panel 418 is managed rearward during 1 bow articulation. A linkage assembly can either be a unique bow structure or links can consist of articulating door rail segments, e.g., 420 and 421 providing articulation and sealing surface(s). The door rail segments act as both linkages for articulation and as sealing surface for the doors and/or top deck, according to an aspect of the present invention. Hinge points 424, 426 could be double as shown or singular (and also offset/gooseneck, etc).

In an embodiment of the present invention, the frame 419 includes at least one side door rail on each side of the assembly 410 operably coupled to the second link 420 and operably coupled to the vehicle (e.g., connected to the sport bar), and/or a rear header, and/or fabric management bows operably coupled to the cover 418, and/or other component(s) suitable to effectively articulate the assembly 410.

Figure 27:
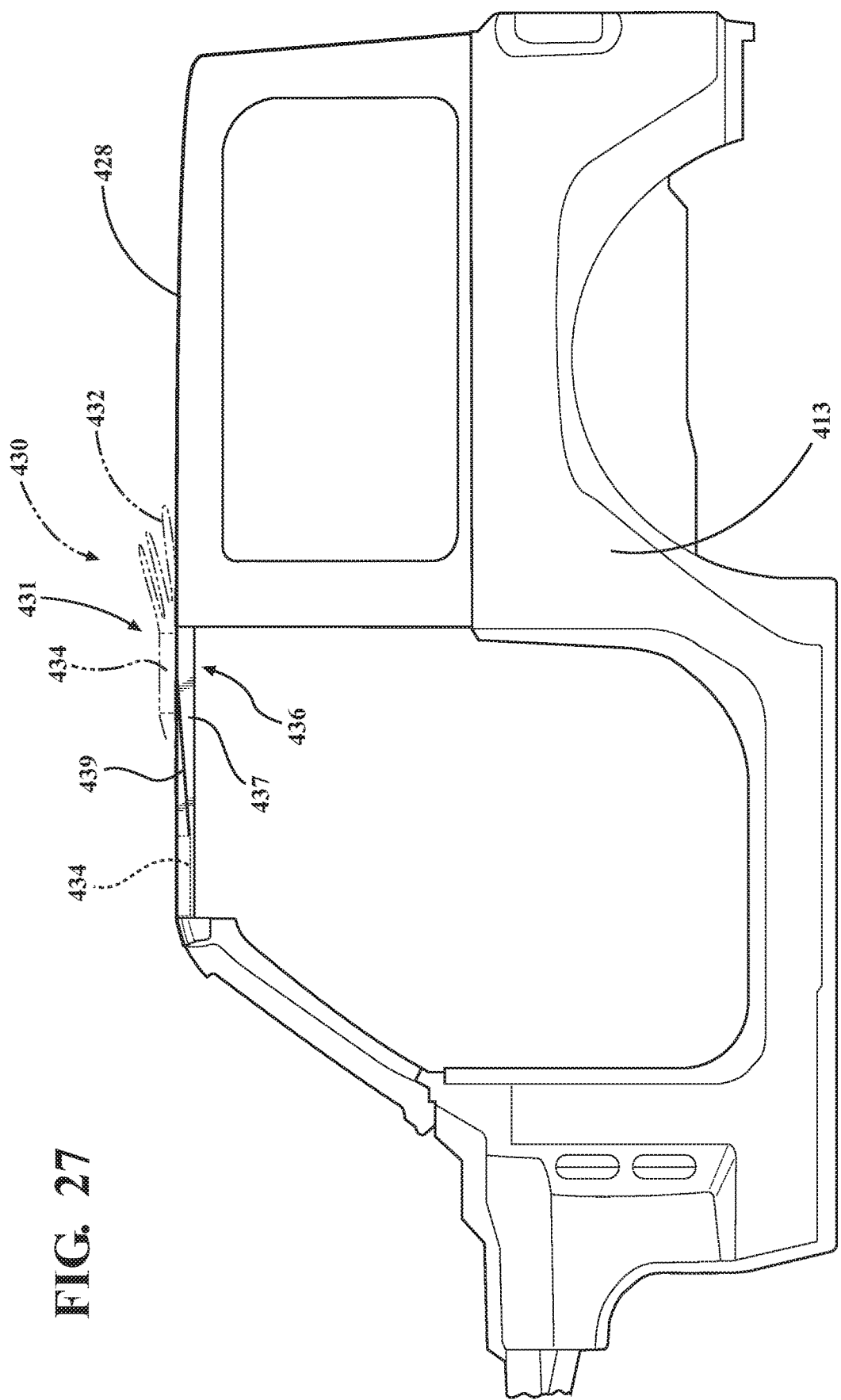
FIG. 27 is a side elevation view of a soft panel top cover assembly shown in an open position connected to a 2-door vehicle, in accordance with another embodiment of the present invention.

FIG. 27 depicts a soft top assembly 430 according to an embodiment of the present invention including an articulating portion or sunroof portion shown generally at 431 with a cover 432 that is a soft top material moveable between a closed position and at least one open position, said assembly 430 operably connected to the vehicle 413 and operably sealable against a hard top 428. By way of non-limiting example, the cover 432 is twill acrylic fabric or sailcloth fabric. The closed position closes off the occupant compartment. The open position, indicated generally at 436 (in phantom), exposes the occupant compartment providing the open air feel. The cover 432 is operably coupled to a front header 434 and/or a frame to move between the closed/open positions. Preferably, a frame, e.g., including a track, is provided and operably coupled to and/or incorporating a door rail, and/or a rear header, and/or other attachment component(s) and operably connected to the vehicle 413, e.g., such as to the side sports bar(s) and/or cross car member, and/or hard top 428, etc.

The front header 434 is connectable to a windshield frame area when in the closed position, and the front header 434 travels with the sunroof portion to the open position 432. Preferably the sunroof portion 436 is operably slid, alternatively rotated or otherwise suitably moved, toward the hard top 428, as indicated by the arrow, for moving the unit back and out of the way. The cover 432 preferably operably folds in an accordion like fashion and rests on top of the hard top 428. It is contemplated that the header 434 is positionable generally above the hard top 428 area without departing from the scope of the present invention. According to an aspect of the present invention, the frame includes a track 439 (e.g., incorporated in the frame or operably attached thereto), e.g., a captive motion track connected to a door rail, for a slidable member of the sunroof portion 431 to move between the closed position and at least one open position. Alternatively, the track 439 is directly connected to a sport bar 437.

Providing at least one stop to set a predetermined height of any hardware of the assembly 430 in the open sunroof position above the hard top 428 is contemplated without departing from the scope of the present invention. Providing at least one hinged pivot point is contemplated without departure from the present invention. Providing at least one fabric management bow, e.g., fixed and/or articulating bow(s), is contemplated without departure from the present invention. Providing at least one linkage assembly incorporated for moving the sunroof portion between the open/closed positions is contemplated without departure from the present invention. Providing at least one cabin lighting device on the assembly 430 is contemplated without departure from the present invention. Providing the frame with at least one door rail, preferably a pair of door rails, and/or rear header is contemplated without departing from the scope of the present invention. Providing at least one seal is contemplated without departure from the present invention, e.g., front header seal(s) 434, rear header seal(s), sunroof portion seal(s), etc. and combinations thereof. Adapting for sealing engagement with a soft top, slanted back top, and any other vehicle top is also contemplated without departure from the present invention. Operably adapting for use with environment diffusion shade(s) connected over the cockpit is also contemplated without departure from the present invention.

Referring further to FIG. 27, preferably the soft panel covers the occupants. The front header 434 or "1 bow" is released from the windshield and slides rearward (e.g., mostly horizontally) in a track system exposing the front driver's compartment. The soft panel material is managed rearward as the front header 434 is articulated. The system could be manual or could be powered. A spring fabric management stiffener is provided in one embodiment.

Figure 28:
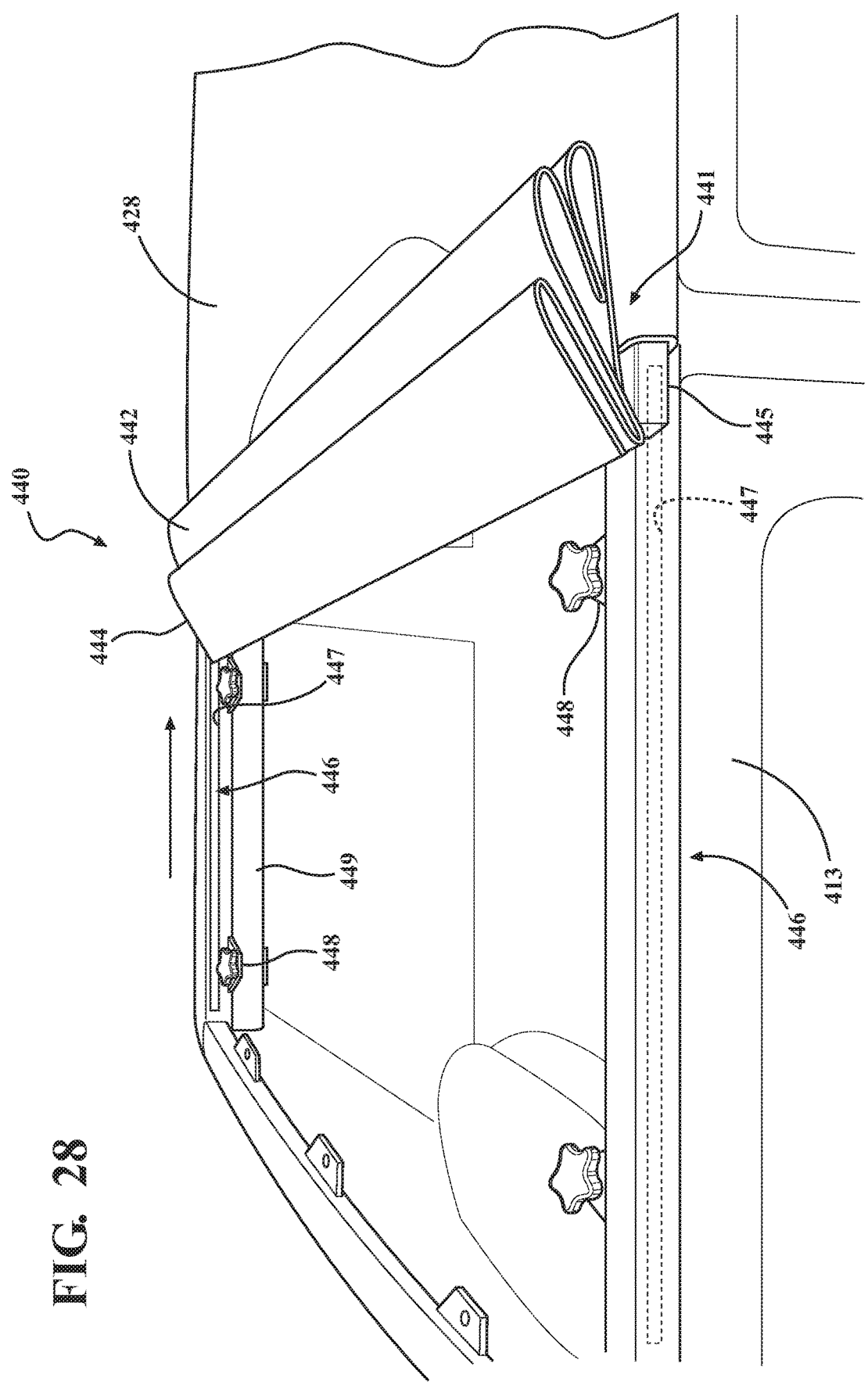
FIG. 28 is a perspective view of a soft panel top cover assembly shown in an open position connected to a 2-door vehicle, in accordance with another embodiment of the present invention.

FIG. 28 depicts a soft top assembly 440 according to an embodiment of the present invention including a sunroof portion or articulating portion shown generally at 441 with a cover 442 that is a soft top panel material moveable between a closed position and at least one open position. The assembly 440 is operably connected to the vehicle 413 and operably sealable against a hard top 428. By way of non-limiting example, the cover 442 is twill acrylic fabric or sailcloth fabric. The closed position closes off the occupant compartment. The open position, generally depicted in FIG. 28, exposes the occupant compartment providing the open air feel. The cover 442 is operably coupled to a front header 444 and/or a frame to move between the closed and open positions.

Preferably, a frame is provided and is operably coupled to and/or incorporates a door rail 446, and/or a rear header, and/or other component(s) and operably connected to the vehicle 413, e.g., such as to the side sports bar(s) and/or cross car member, and/or hard top 428, etc. The front header 444 is connectable to a windshield frame area when in the closed position, and the front header 444 travels with the sunroof portion to the open position.

Preferably the articulating portion 441 is operably slid, alternatively rotated or otherwise suitably moved, toward the hard top 428, as indicated by the arrow, for moving the unit back and out of the way. Typically, a slidable member 445 is operably configured for sliding and operably coupled to the articulating portion 441 to slide within a channel 447. By way of non-limiting example the door rail 446 (or any suitable attachment structure) of the frame is provided with a generally horizontal channel 447 (alternatively, a track, C-shaped track, etc) for sliding the header 444 or another component back and forth in the channel 447 between the closed and open positions.

The sliding member 445 is a pin, roller, roller bearing and/or any suitable slidable piece captured in the channel 447 to move the sunroof portion between the closed and open positions when desired. A plurality of intermittent open positions are contemplated depending on the application without departure from the scope of the present invention. A mechanical lock operable to selectively engage the slidable member 445 to keep the sunroof in the open position when desired is within the scope of the present invention.

The door rail 446 is operably connected to the vehicle 413 with at least one fastening portion, such as providing at least one clamping surface shown generally at 448 on door rail 446 which fastens to the sports bar 449 with at least one fastener, e.g., mushroom knob that screws into the sport bar 449. The cover 442 preferably operably folds in an accordion like fashion and rests on top of the hard top 428.

According to an aspect of the present invention, the door rails 446,446 are operably connected to, or integrally formed with, a rear and/or front header cross car member(s) forming a cassette type attachment system, e.g., 1-piece cassette, multi-piece cassette, 3-piece cassette.

Providing at least one stop to set a predetermined height of any hardware of the assembly 440 in the open sunroof position above the hard top 428 is contemplated without departing from the scope of the present invention. Providing at least one hinged pivot point is contemplated without departure from the present invention. Providing at least one fabric management bow, e.g., fixed or articulating bow(s), is contemplated without departure from the present invention. Providing at least one linkage assembly incorporated for moving the sunroof portion between the open/closed positions is contemplated without departure from the present invention. Providing at least one cabin lighting device on the assembly 450 is contemplated without departure from the present invention. Providing the frame with at least one door rail, preferably a pair of door rails, and/or rear header is contemplated without departing from the scope of the present invention. Providing at least one seal is contemplated without departure from the present invention, e.g., front header seal(s) 458, rear header seal(s), sunroof portion seal(s), etc. and combinations thereof. Adapting for sealing engagement with a soft top, slanted back top, and any other vehicle top is also contemplated without departure from the present invention. Operably adapting for use with environment diffusion shade(s) connected over the cockpit is also contemplated without departure from the present invention.

Figure 29:
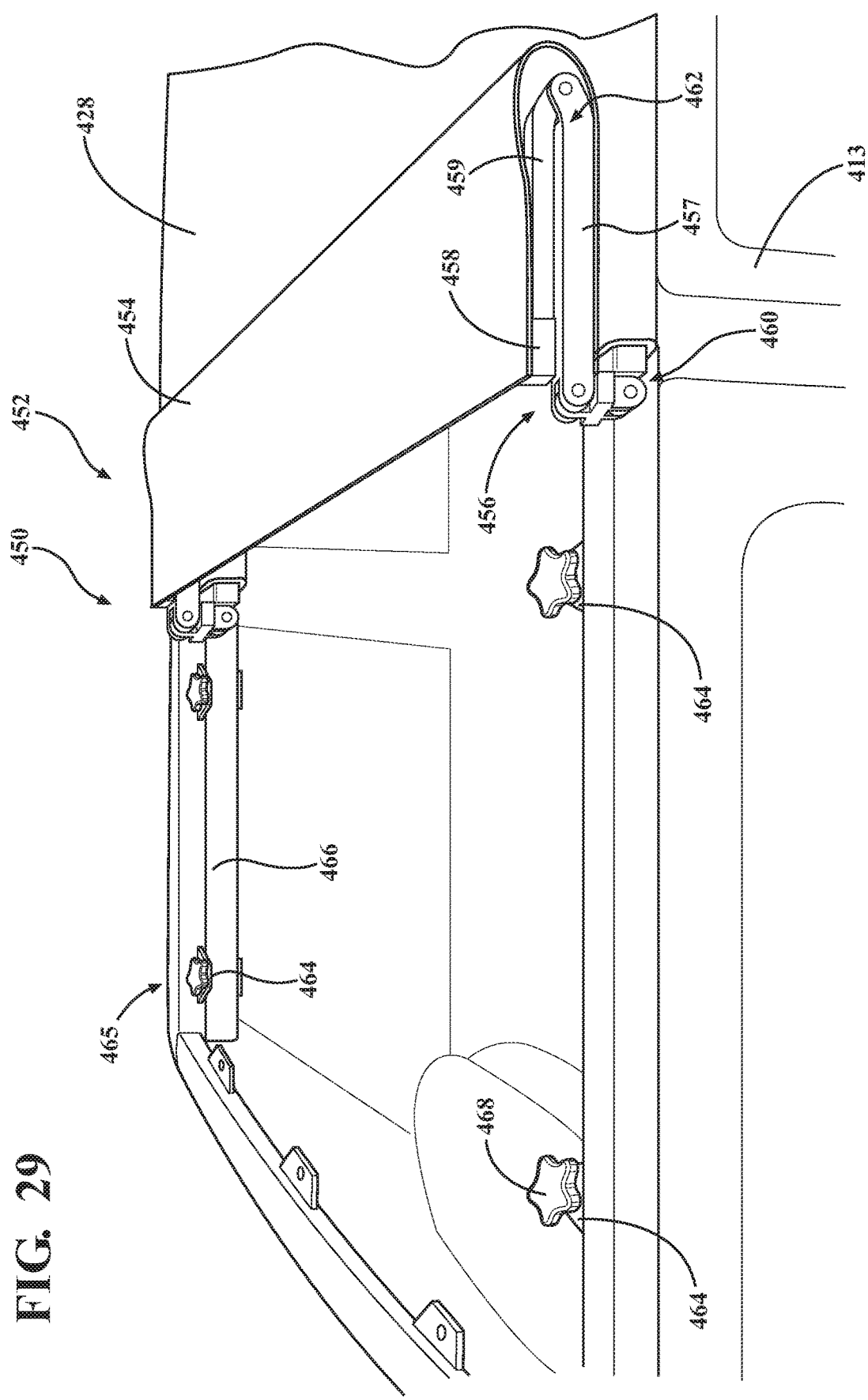
FIG. 29 is a perspective view of a soft panel top cover assembly shown in an open position connected to a 2-door vehicle, in accordance with another embodiment of the present invention.

FIG. 29 depicts a soft top assembly 450 according to an embodiment of the present invention including a sunroof portion or articulating portion shown generally at 452 including a cover 454 that is a soft top portion moveable between a closed position (e.g., depicted in FIG. 26) and at least one open position. The assembly 450 is operably connected to the vehicle 413 and operably sealable against a hard top 428. The closed position closes off the occupant compartment. The open position, generally depicted exposes the compartment providing the open air feel.

The cover 454 is operably coupled to a frame indicated generally at 456 to move between the closed/open positions. Preferably, the frame 456 is operably coupled to and/or incorporates at least one side door rail 465, preferably, a pair of door rails 465, and/or rear header, and/or other component(s) and is operably connected to the vehicle 413, e.g., such as to the side sports bar(s) and/or cross car member, and/or hard top 428, etc. Preferably, the cover 454 and/or frame 456 is operably coupled to a front header 458 connectable to a windshield frame area when in the closed position, e.g., with latches, where the front header 458 travels with the sunroof portion to the open position.

At least one hinged pivot point 460 is provided, shown generally at 460, preferably toward the rear of the articulating portion 452, for flipping the unit back and out of the way on top of the hard top 428. At least one intermediate hinged pivot, shown generally at 462, is provided to operably fold the cover 454, e.g., fold generally in half. These hinge points 460 can be single, double or any type of hinge or any other articulating mechanism configured to fold and flip the articulating portion 452 over the leading edge of the hard top 428 and the top 450 is adapted to either rest on or above the hard top 428. The hinge points 460 and/or 462 are operably located for moving the assembly 450 between the open and closed positions, e.g., at least one hinge located on both sides of the articulating portion 452, at least one located toward the rear of the articulating portion 452, and/or at least one extending cross car, etc. and/or combinations thereof. More or less hinging points and more or less folds (e.g., generally in half, thirds, etc.) of the cover 454 are contemplated without departure from the present invention. It is also contemplated that the cover 454 could be operably hinged to fold the header 458 under or in the direction toward the back of the vehicle.

The frame 456 is operably connected to the vehicle 413 with at least one fastening portion, such as providing at least one clamping surface 464 on the frame 456, e.g., on a door rail 465 of the frame, which fastens to the sports bar 466 with at least one fastener 468, e.g., mushroom knob that screws into the sport bar 466. Providing at least one fabric management bow, e.g., fixed or articulating bow(s), is contemplated without departure from the present invention. Providing at least one linkage assembly incorporated for moving the articulating portion 452 between the open/closed positions is contemplated without departure from the present invention. Preferably, at least one linkage assembly is provided and operably connected to the frame, most preferably to the door rail, by at least one pivot point, at least two pivot points on each door rail, etc. Providing the frame with at least one door rail, preferably a pair of door rails, and/or rear header is contemplated without departure from the scope of the present invention. Providing at least one lighting device on the assembly 450 is contemplated without departure from the present invention. Providing at least one stop to set a predetermined height of any hardware of the articulating portion 452 in the open sunroof position above the hard top 428 is contemplated without departing from the scope of the present invention. Providing at least one seal is contemplated without departure from the present invention, e.g., front header seal(s) 458, rear header seal(s), articulating portion 452 seal(s), etc. and combinations thereof. Adapting for sealing engagement with a soft top, slanted back top, and any other vehicle top is also contemplated without departure from the present invention. Adapting for use with environment diffusion shade(s) connected over the cockpit is also contemplated without departure from the present invention.

Figure 30:
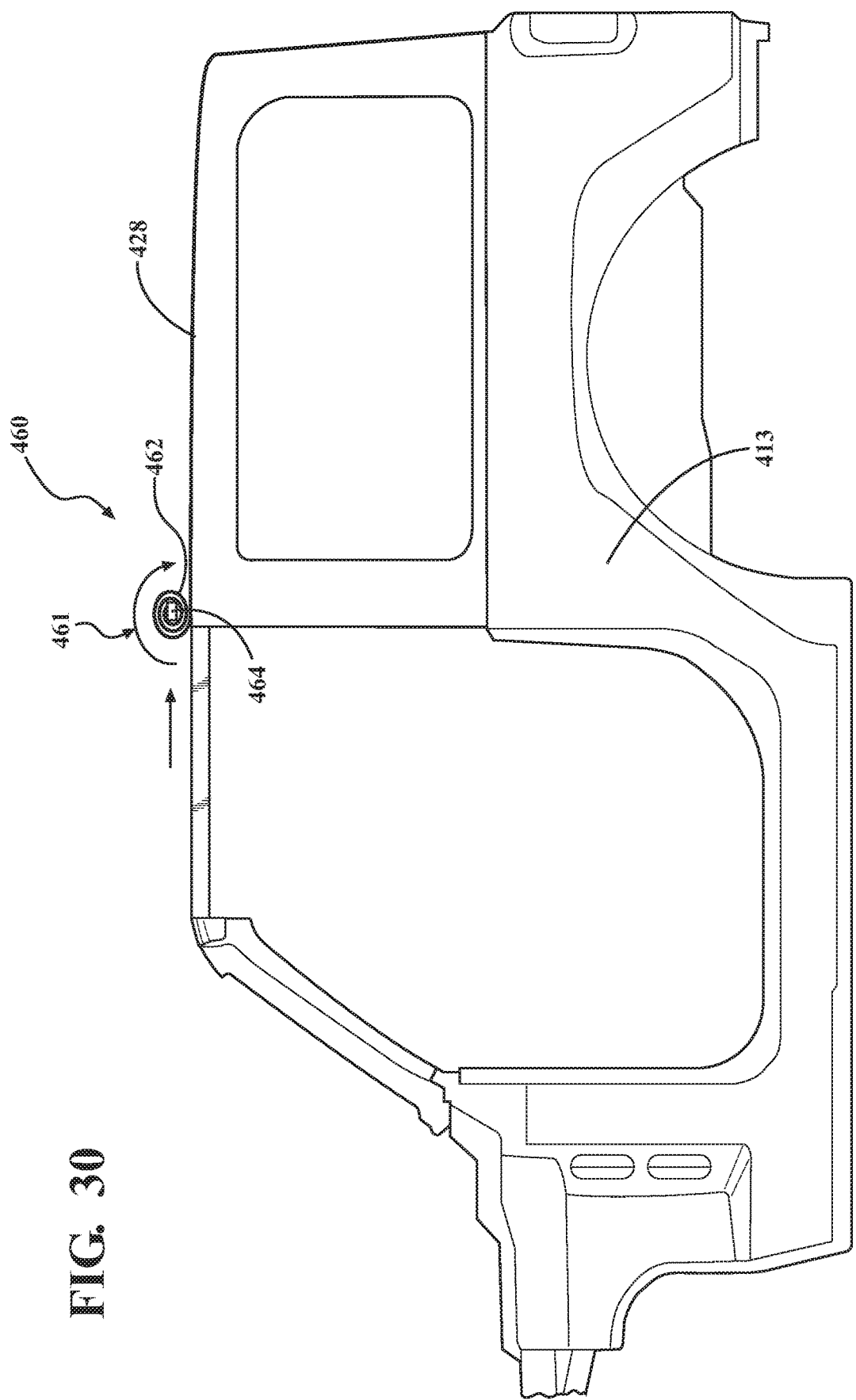
FIG. 30 is a side elevation view of a soft panel top cover assembly shown in an open position connected to a 2-door vehicle, in accordance with another embodiment of the present invention.

FIG. 30 depicts a soft top assembly 460 according to an embodiment of the present invention including a sunroof portion or articulating portion, shown generally at 461, with a cover 462 that is a soft top moveable between a closed position and at least one open position, generally as depicted by the arrows, said assembly 460 operably connected to the vehicle 413 and operably sealable against a hard top 428. In this embodiment the cover 452 is operably connected to the front header 462 and rolls up, as indicated by the arrow. In one embodiment, a frame is also provided which is operably connected to the vehicle 413 with at least one fastening portion. Providing the frame with at least one door rail, preferably a pair of door rails, and/or rear header, and/or other component(s) and is also contemplated without departing from the scope of the present invention. Providing at least one fabric management bow, e.g., fixed or articulating bow(s), is contemplated without departure from the present invention. Providing at least one lighting device on the assembly 460 is contemplated without departure from the present invention. Providing at least one strap or other retaining mechanism to hold the sunroof position adjacent the hard top 428 is contemplated without departing from the scope of the present invention. Providing at least one seal is contemplated without departure from the present invention, e.g., front header seal(s) 464, rear header seal(s), articulating portion seal(s), etc. and combinations thereof. Adapting for sealing engagement with a soft top, slanted back top, and any other vehicle top is also contemplated without departure from the present invention. Adapting for use with environment diffusion shade(s) connected over the cockpit is also contemplated without departure from the present invention.

Referring further to FIG. 30, preferably the header section is rolled rearward, managing the material and exposing the front compartment. Alternatively, the front header stays affixed and a rear header released and rolled forward. The sides can be trim locked. Tongue and loop can also be provided. The roll style assembly is adaptable to roll forward and/or rearward.

Figure 31:
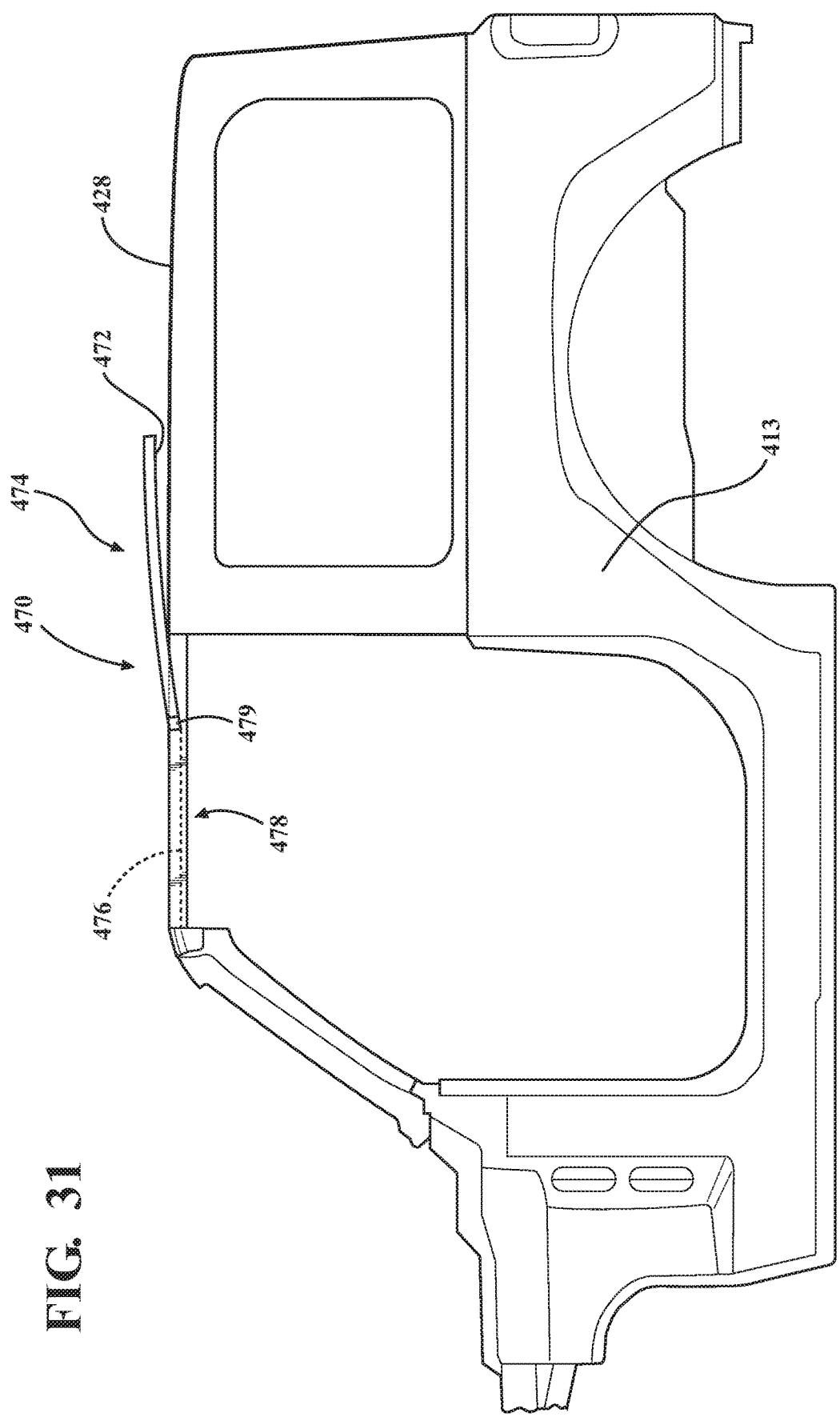
FIG. 31 is a side elevation view of a soft panel top cover assembly shown in an open position connected to a 2-door vehicle, in accordance with another embodiment of the present invention.

FIG. 31 depicts an articulatable top assembly 470 according to an embodiment of the present invention including a sunroof portion or articulating portion shown generally at 474 where the cover is composed of at least one solid panel 472, e.g., hard solid or semi-rigid panel, moveable between a closed position and at least one open position, said assembly 470 operably connected to the vehicle 413 and operably sealable against a hard top 428. The articulating portion 474 slides back, such as sliding a rail of the articulating portion 474 in a channel 476 or a track incorporated in or operably connected to the side frame, indicated generally 478, operably connected to the vehicle 413, according to one embodiment of the invention. The side frame 478 can include a door rail connected to a sport bar, track connected to a sport bar or other suitable structure. Providing the frame with at least one door rail, preferably a pair of door rails, and/or rear header, and/or other component(s) and is also contemplated without departing from the scope of the present invention. Providing at least one linkage assembly is contemplated without departure from the present invention. Providing at least one lighting device on the assembly 470 is contemplated without departure from the present invention. Providing at least one stop to set a predetermined height of any hardware of the articulating portion 474 in the open sunroof position adjacent the hard top 428 is contemplated without departing from the scope of the present invention. Providing at least one seal is contemplated without departure from the present invention, e.g., front header seal(s), rear header seal(s), articulating portion seal(s), etc. and combinations thereof. Adapting for sealing engagement with a soft top, slanted back top, and any other vehicle top is also contemplated without departure from the present invention. Adapting for use with environment diffusion shade(s) connected over the cockpit is also contemplated without departure from the present invention.

The articulating portion 484 is preferably provided with a sliding member 479 captured in the channel 476, e.g., that is a pin, roller, roller bearing and/or any suitable slidable piece captured in the channel 476 to move the sunroof portion between the closed and open positions when desired. A mechanical lock, tongue and loop or any other suitable predetermined locking feature operable to selectively engage the slidable member 479 or other component to keep the sunroof in the open position when desired is within the scope of the present invention.

Referring further to FIG. 31, preferably the solid panel(s) 472 slide rearward exposing the front cockpit. There can be a single panel 472 or at least two panels 472 (e.g., driver panel and passenger panel). A plurality of cross car panels 472 that stack as the top is operated rearward is also contemplated without departing from the scope of the present invention. Side way stack either way in either cross car direction is also contemplated.

Figure 32:
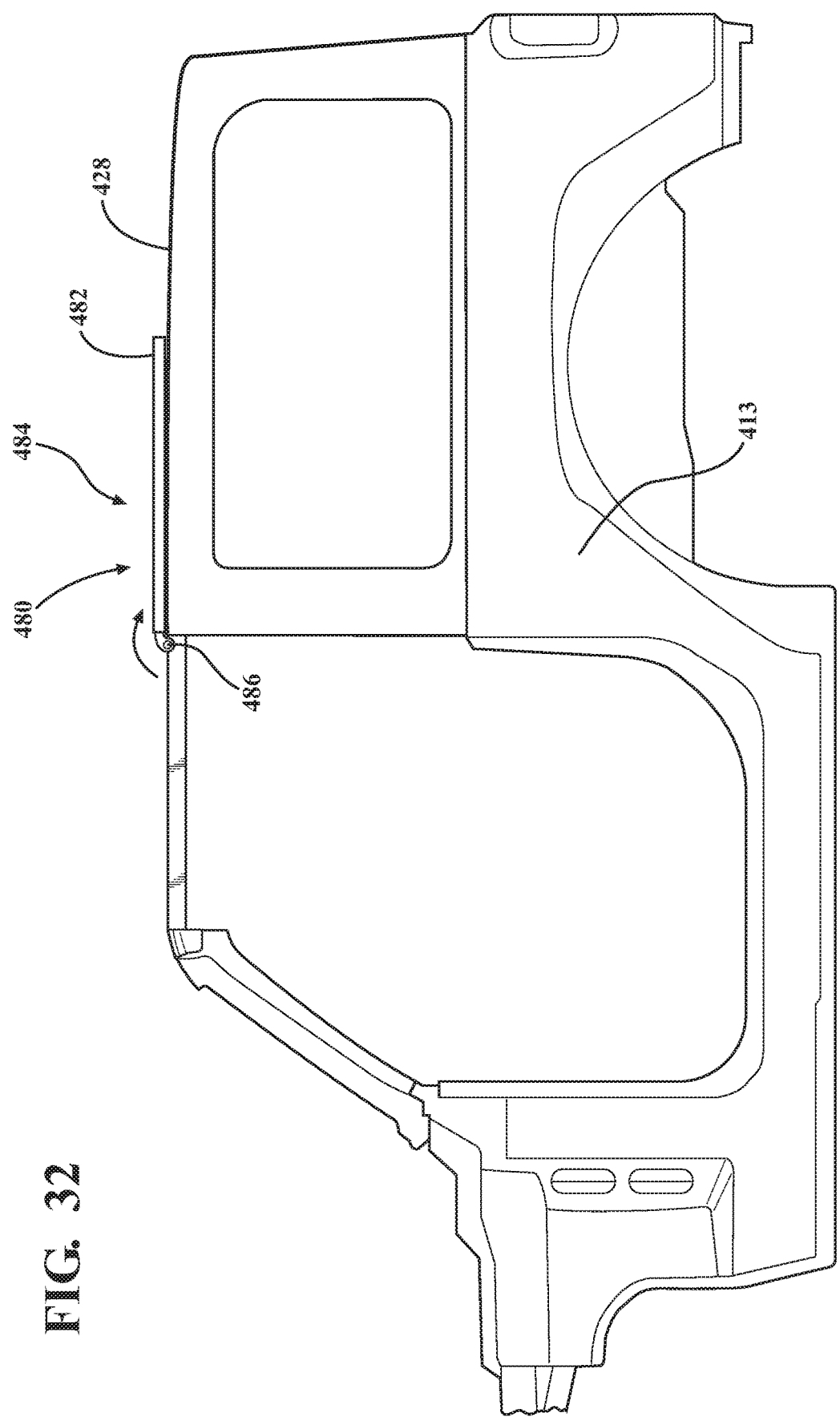
FIG. 32 is a side elevation view of a soft panel top cover assembly shown in an open position connected to a 2-door vehicle, in accordance with another embodiment of the present invention.

FIG. 32 depicts an articulating top assembly 480 according to an embodiment of the present invention including an articulating portion or sunroof portion shown generally at 484 where the cover is composed of at least one front panel 82 that moveable between a closed position and an open position, generally as depicted by the arrow, said assembly 480 operably connected to the vehicle 413 and operably sealable against a hard top 428. The articulating portion 484 flips back. The articulating portion 484 is operably coupled to a frame that includes at least one hinge point 486, e.g., such as a single hinge point operably coupled with a door rail or sport bar or other suitable structure, to move the panel(s) 482 between the closed/open positions. Preferably, the frame is operably coupled to and/or incorporates at least one side door rail, preferably, a pair of door rails, and/or rear header, and/or other component(s) and is operably connected to the vehicle 413, e.g., such as to the side sports bar(s) and/or cross car member, and/or hard top 428, etc. Preferably, the panel(s) 482 and/or frame is connectable to a windshield frame area when in the closed position. At least one hinged pivot point 486 is provided, preferably toward the rear of the sunroof portion, for flipping the unit back and out of the way. Additional hinge points and hinging locations are contemplated without departure from the present invention. Preferably at least one hinge point is provided on each side. Providing at least one linkage assembly incorporated for moving the articulating portion 484 between the open/closed positions is contemplated without departure from the present invention. Providing the frame with at least one door rail, preferably a pair of door rails, and/or rear header is contemplated without departing from the scope of the present invention. Providing at least one lighting device on the assembly 480 is contemplated without departure from the present invention. Providing at least one stop to set a predetermined height of any hardware of the articulating portion 484 in the open sunroof position above the hard top 428 is contemplated without departing from the scope of the present invention. Providing at least one seal is contemplated without departure from the present invention, e.g., front header seal(s), rear header seal(s), articulating portion 484 seal(s), etc. and combinations thereof, e.g., closed cell, rubber, bulb, flange, and/or mucket seal(s). Adapting for sealing engagement with a soft top, slanted back top, and any other vehicle top is also contemplated without departure from the present invention. Adapting for use with environment diffusion shade(s) connected over the cockpit is also contemplated without departure from the present invention.

Referring further to FIG. 32, preferably the panel is solid or a rigid framework with soft panel insert/skin. The panel is selectively released from the windshield header and flipped rearward exposing the front compartment. The panel is a single panel or a plurality of panels (e.g., driver side and passenger side). There is provided a frame and multiple panels. The panels are vacuum formed, e.g., inner panel and outer panel.

FIGS. 33A, 33B and 34 depict a soft top assembly 490 according to an embodiment of the present invention including a sunroof portion or articulating portion shown generally at 494 with a cover 495 that is a soft top moveable between a closed position and an open position, generally as depicted by the arrows, said assembly 490 operably connected to the vehicle 413 and operably sealable against a hard top 428. The cover is also operably connected to a front header 496, depicted in the closed, articulating, and open positions. The cover 492 is operably coupled to a frame, shown generally at 493, that includes at least one link 497 (preferably, at least two links 497, 497a) each connected at a respective hinge point 498, e.g., such as a hinge point provided on a door rail 499 of the frame, or, alternatively, to a sport bar of the vehicle, to move the cover between the closed/open positions. Preferably, at least two hinge points 498, 498a on each door rail 499 connect respective first and second links 497 and 497a. Preferably, the frame is operably coupled to and/or incorporates at least one side door rail 499, preferably, a pair of door rails, and/or rear header, and/or other component(s) and is operably connected to the vehicle 413, e.g., such as to the side sports bar(s) and/or cross car member, and/or hard top 428, etc. Preferably, the cover and/or frame is operably coupled to a front header connectable to a windshield frame area when in the closed position, where the front header travels with the articulating portion 490 to the open position. Additional hinge points and hinging locations are contemplated without departure from the present invention. The frame includes at least one linkage assembly operably for moving the articulating portion 494 between the open/closed positions. The linkage assembly preferably includes at least the two hinge points 498, 498a and at least two links 499, 499a, however, additional links are contemplated (such as at least one intermediate link hinged at the first and second links connecting the links together). Preferably, the front header 496 is generally horizontal throughout the rotation from the closed to open position and is horizontally disposed in the closed position. Alternatively, it is contemplated that the header flips back or is tilted. Providing at least one fabric management bow, e.g., fixed or articulating bow(s), is contemplated without departure from the present invention. Preferably, the cover is manipulated in a generally accordion like fashion to the closed position. Providing the frame with at least one door rail and/or rear header is contemplated without departing from the scope of the present invention. Providing at least one lighting device on the assembly 490 is contemplated without departure from the present invention. Providing at least one stop to set a predetermined height of any hardware of the articulating portion 494 in the open sunroof position above the hard top 428 is contemplated without departing from the scope of the present invention. Providing at least one seal is contemplated without departure from the present invention, e.g., front header seal(s), rear header seal(s), articulating portion 494 seal(s), etc. and combinations thereof, e.g., closed cell, rubber, bulb, flange, and/or mucket seal(s). Adapting for sealing engagement with a soft top, slanted back top, and any other vehicle top is also contemplated without departure from the present invention. Adapting for use with environment diffusion shade(s) connected over the cockpit is also contemplated without departure from the present invention.

Referring further to FIGS. 33A-34, preferably the header or 1-bow 496 seals to the windshield frame, or if cassette is used, to the cassette front rail. The 1-bow 496 is released and articulated rearward. The links 498, 498a are operably pivotally mounted in the door rail and/or sport bar. The header 496 maintains the horizontal orientations. The articulating portion 494 stows rearward of the front compartment and operably manages the cover material 495.

FIGS. 33A-34 depict the header 496 of the articulating portion 494 remaining in the same orientation as it moves from the closed to open positions (e.g., header 496 is not flip over to expose a bottom surface of the header).

The frame 493 is operably connected to the vehicle 413 with at least one fastening portion, such as providing at least one clamping surface on the frame, e.g., on a door rail 499 of the frame, which fastens to the sports bar of the vehicle with at least one fastener, e.g., mushroom knob that screws into the sport bar 466. Providing at least one fabric management bow, e.g., fixed or articulating bow(s), is contemplated without departing from the present invention.

Referring to FIGS. 35-38 generally, there are depicted various attachment methods adaptable for incorporation with any of the aforementioned embodiments, in particular, for selectively using with any of the articulating portions depicted in FIGS. 26-34.

Figure 35:
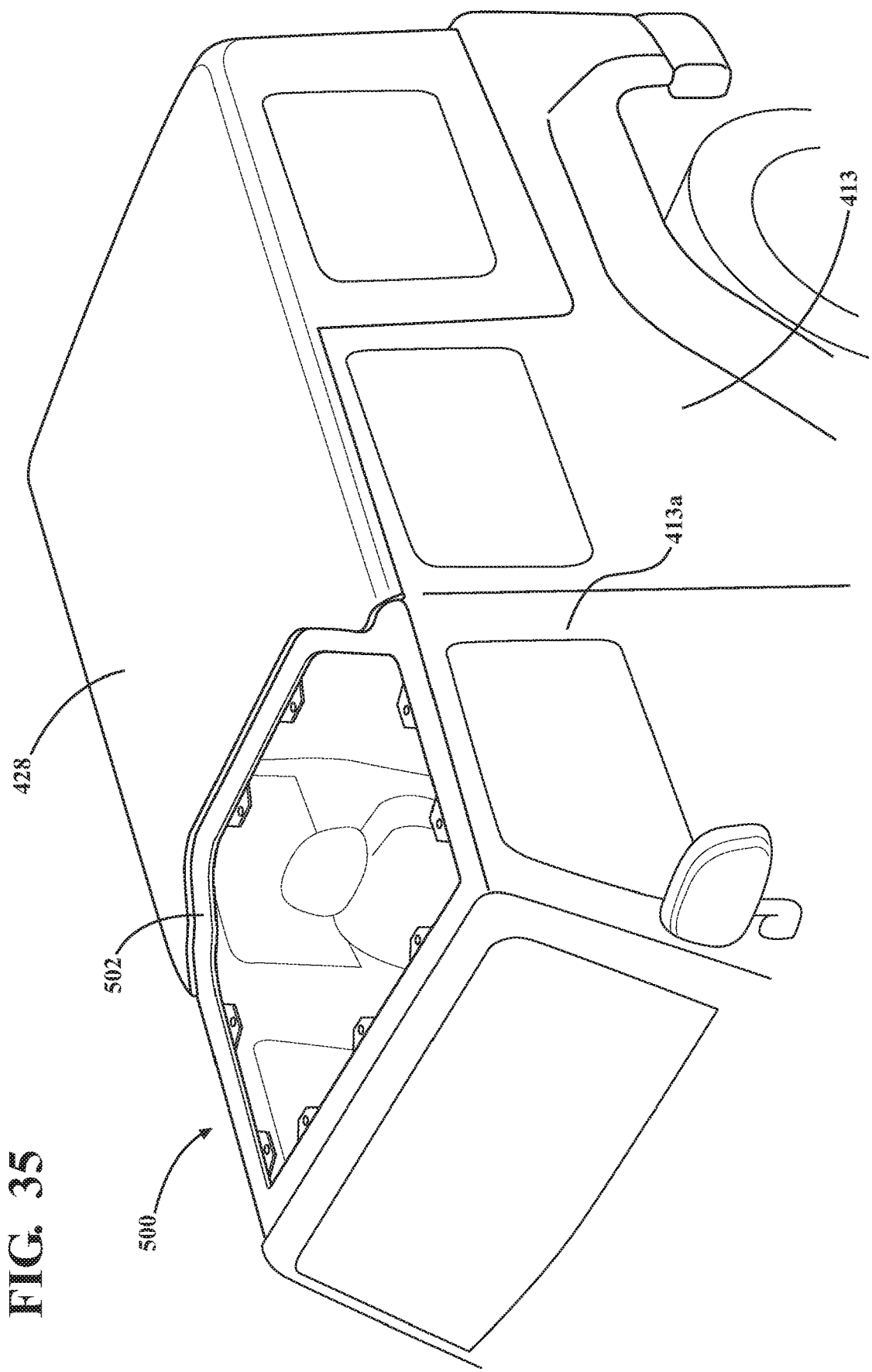
FIG. 35 is a perspective view of an attachment arrangement for a top cover assembly connected to a 2-door vehicle, in accordance with another embodiment of the present invention.

FIG. 35 depicts a sunroof frame attachment assembly shown generally at 500 according to an embodiment of the present invention including at least one attachment portion 502 operable for an articulating portion (omitted for clarity, but, according to a broad aspect of the present invention, is understood to be any articulating assembly depicted in FIGS. 26-34 that moves between at least a closed position and at least one open position for an open front cockpit feel). There is depicted a cassette 502 style attachment. The cassette 502 attachment is a one-piece frame located for sealing engagement to the front and rear (adjacent the windshield frame and hard top sealing edge). Both sides of the one-piece frame also seal to the front vehicle doors 413a. The frame 500 operably connects to the vehicle 413, e.g., to the sport bars, vehicle opening frame, cross car member, and/or windshield frame, etc. and any combinations thereof).

Figure 36:
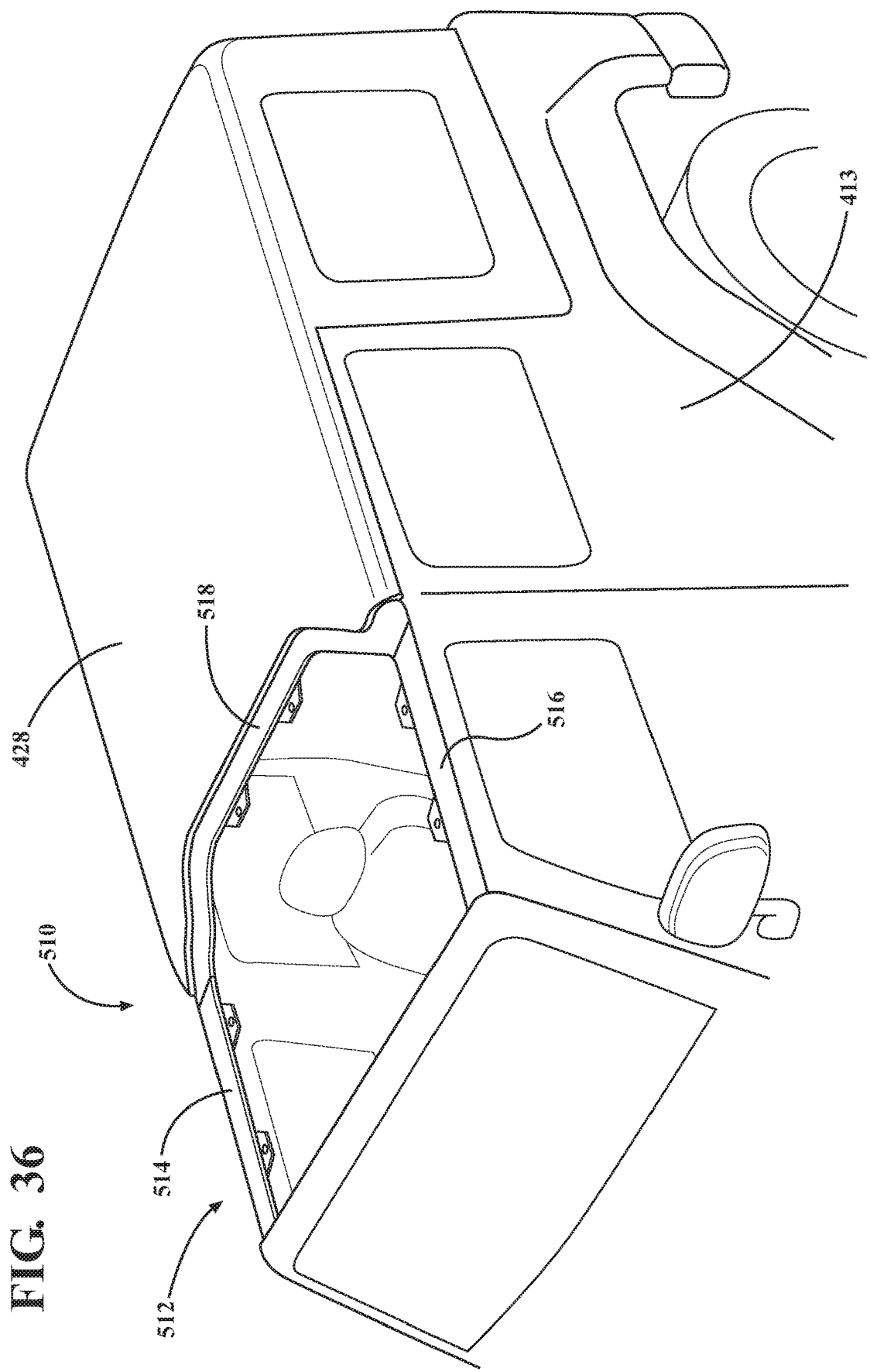
FIG. 36 is a perspective view of an attachment arrangement for a top cover assembly connected to a 2-door vehicle, in accordance with another embodiment of the present invention.

FIG. 36 depicts a sunroof frame attachment assembly shown generally at 510 according to an embodiment of the present including at least one attachment portion operable for an articulating portion (omitted for clarity, but, according to a broad aspect of the present invention, is understood to be any articulating assembly depicted in FIGS. 26-24 that moves between at least a closed position and at least one open position for an open front cockpit feel). There is depicted a 3-piece frame shown generally at 512, including a first door rail 514, a second door rail 516 and a rear header 518. More or less pieces are contemplated without departing from the scope of the present invention. Thus, the assembly 510 utilizes door rails and a rear header. The door rails 514, 516 act as sealing surface for the articulating top (e.g., any articulating assembly depicted in FIGS. 26-34) and front doors 413a. The door rails 514, 516 also preferably provide mounting for at least one pivot point or hinge point and/or a rail or track system. The rear header 518 operably seals to the factory hard top 428 and acts as a mounting panel for soft goods. The rear header 518 is a single piece or a plurality of pieces operably connected together (preferably, a single piece), and is preferably lightweight (e.g., wireframe and/or lightweight molded piece(s). The frame 510 operably connects to the vehicle 413, e.g., to the sport bars, vehicle opening frame, cross car member, and/or windshield header frame, etc. and any combinations thereof).

Figure 37:
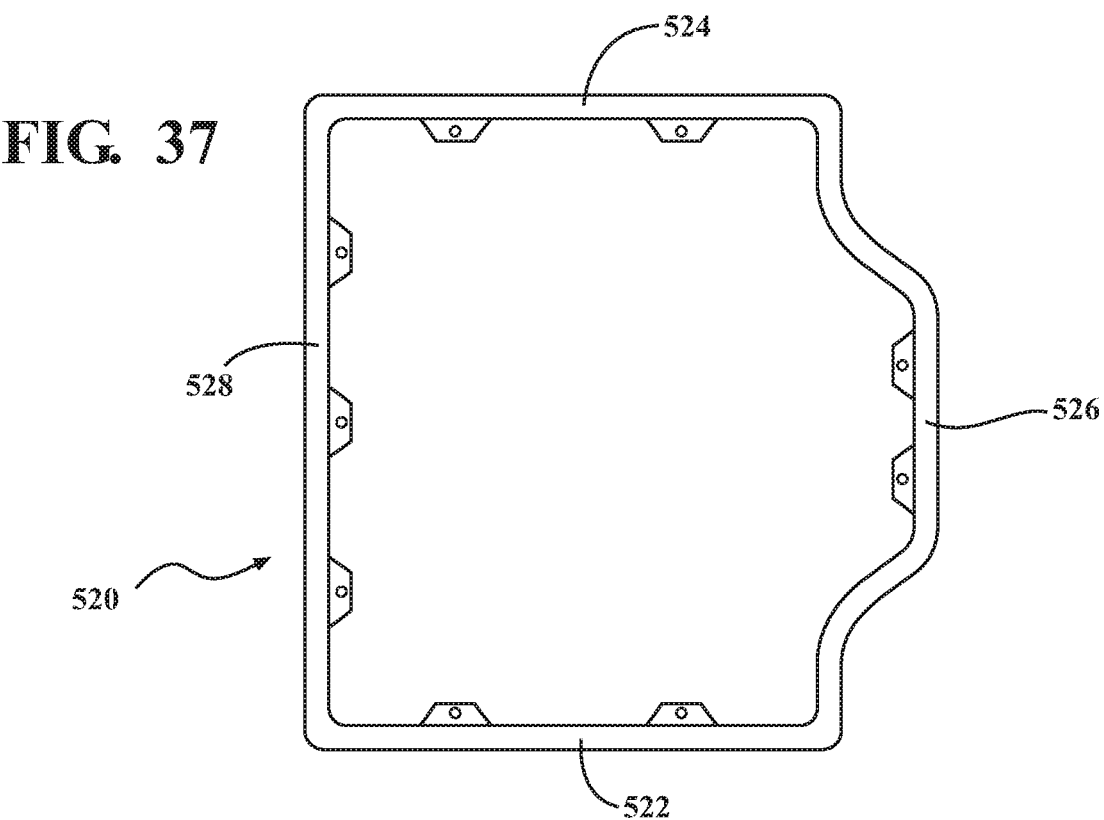
FIG. 37 is a top plan view of an attachment arrangement for a top cover assembly connectable to a vehicle, in accordance with another embodiment of the present invention.

FIG. 37 depicts a one-piece cassette shown generally at 520 that is a drop-in cassette style. The cassette 520 is a sunroof frame attachment assembly providing at least one attachment portion for an articulating portion (articulating portion is omitted for clarity, but, according to a broad aspect of the present invention, is understood to be any articulating assembly depicted in FIGS. 26-34 that moves between at least a closed position and at least one open position for an open front cockpit feel). The cassette 520 operably attaches using at least one, preferably a plurality, of attachment points on both sides 522 and 524, e.g., providing door rails that seal with the vehicle and top, and the rear 526, e.g., providing a rear header in sealing engagement with the hard top 428. The front header 528 affixes to one or more of the footman loops provided on the vehicle 413 near the windshield frame. The frame 520 further operably connects to the vehicle 413, e.g., to the sport bars, vehicle opening frame, and/or cross car member, etc. and any combinations thereof).

Figure 38:
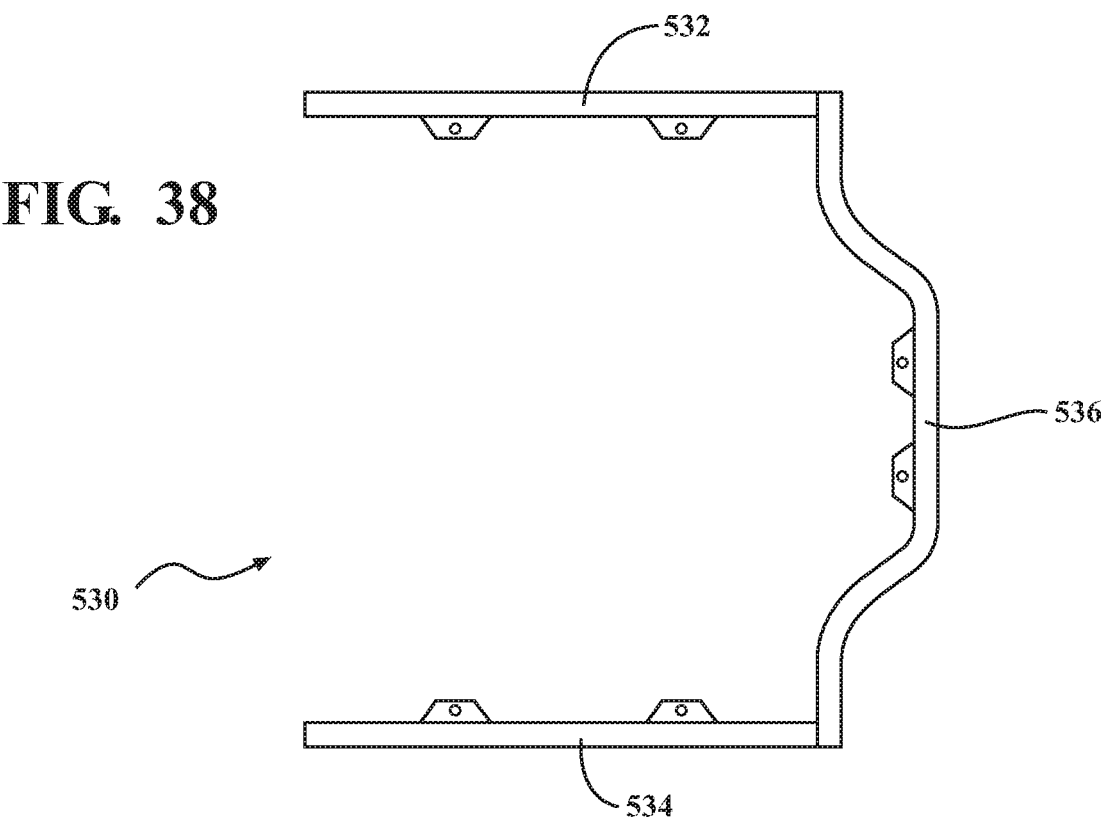
FIG. 38 is a top plan view of an attachment arrangement for a top cover assembly connectable to a vehicle, in accordance with another embodiment of the present invention; and, FIG. 39 is an exemplary rear header seal arrangement against an existing hard top seal and hard top of a vehicle, in accordance with an embodiment of the present invention.

FIG. 38 depicts a 3-piece cassette shown generally at 530. The cassette 530 operably attaches using at least one, preferably a plurality, of attachment points on the sides 532, 534 and rear 536 headers, e.g., providing door rails that seal with the vehicle and top and a rear header in sealing engagement with the hard top 428 seal. Providing a front header, separate or incorporated with the sides, is contemplated without departure from the scope of the present invention. The 3-piece cassette 530 is a sunroof frame attachment assembly providing at least one attachment portion for an articulating portion (articulating portion is omitted for clarity, but, according to a broad aspect of the present invention, is understood to be any articulating assembly depicted in FIGS. 26-34 that moves between at least a closed position and at least one open position for an open front cockpit feel).

Figure 39:
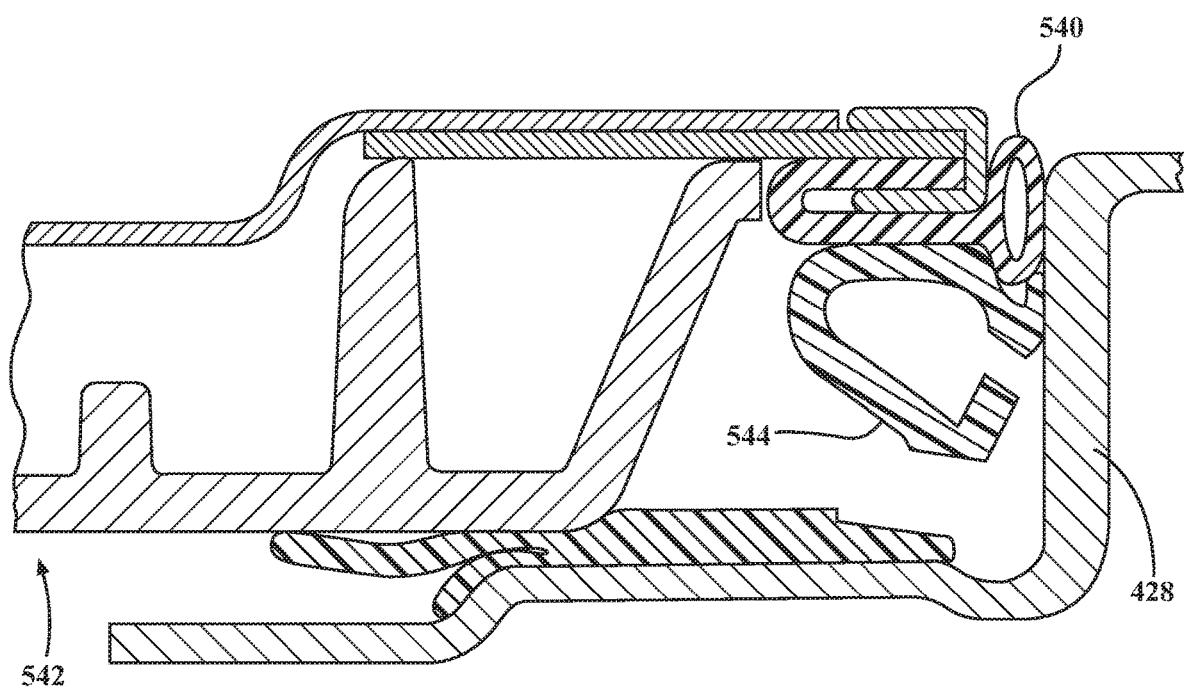

FIG. 39 depicts an exemplary rear header seal 540 provided on a rear header shown generally at 542 sealing against an existing seal 544 of a hard top portion 428 that can be incorporated on any of FIGS. 26-38, according to an embodiment of the present invention.

Referring to the figures generally, providing at least one seal, e.g., rubber, foam, etc., to prevent water from entering the vehicle is contemplated without departing from the scope of the present invention. Preferably, rubber to prevent water permeation. According to one embodiment, the seal, e.g., bulb seal, is located on a door rail and seals off. Providing at least one hole in a trough/lip area of a door rail, e.g., between door edge and door weather-strip, for assisting with water drainage is contemplated without departing from the scope of the present invention. The present invention additionally or alternatively includes one or more of any of the following: That in any of the aforementioned embodiments, the soft top assembly is operably adaptable depending on the application to be in sealing engagement with a hard top roof portion. In any of the aforementioned embodiments, the soft top assembly further includes at least one rear header portion adaptable to be in sealing engagement with a hard top roof portion. In any of the aforementioned embodiments, the soft top assembly further includes at least one rear header portion adaptable to be in sealing engagement with at least one existing seal of a hard top roof portion. In any of the aforementioned embodiments, the soft top assembly further includes at least one rear header portion with at least one seal adaptable to be in sealing engagement with a hard top roof portion surface(s) and/or at least one existing seal of a hard top roof portion. In any of the aforementioned embodiments, the soft top assembly is adaptable to have a plurality of rigid and/or semi rigid cover sections (e.g., that fold, stack, flip, and/or slide, or otherwise create the open air sunroof feel, and/or combinations thereof) where at least one is adaptable to be in sealing engagement with a hard top roof portion. In any of the aforementioned embodiments, the soft top assembly further includes at least one door rail on each side adaptable to be in sealing engagement with a front door. In any of the aforementioned embodiments, the soft top assembly further includes at least one door rail on each side adaptable to provide at least one pivot point for a sunroof portion. In any of the aforementioned embodiments, the soft top assembly further includes at least one attachment surface on each side of the vehicle adaptable to be operably connected to the vehicle, e.g., to a sport roll bar. In any of the aforementioned embodiments, the soft top assembly further includes at least one seal to provide a weather tight seal and/or back-up weather tight seal anywhere on the assembly, e.g., such as where contacting the vehicle. In any of the aforementioned embodiments, the soft top assembly further includes at least one whether dampening cover that stays in place when the soft top assembly is moved to the open position. Providing a header that is steel, cast aluminum, molded plastic, or any other material to meet predetermined requirements is contemplated without departing from the scope of the present invention, preferably, the header is cast aluminum. The cover is operably coupled to the header, in a preferred embodiment. Visual attachment of fasteners for access is contemplated without departing from the scope of the present invention. Preferably, the soft panel top assembly is secured to a windshield frame with quick release latches. Locating features on each latch and a corresponding saddle on the windshield frame are contemplated without departing from the scope of the present invention. Pivotal clamping surface mechanism(s) or any other suitable attachment mechanism(s) for aligning and fixing to the vehicle is contemplated without departure from the scope of the present invention. At least one locking mechanism, e.g., rear location to lock down position of top in down position, and/or at least one trigger release arrangement is contemplated without departing from the scope of the present invention. Incorporating removable soft upper half door(s), soft full door(s) and/or soft quarter panels with any of the above soft panel top cover assemblies is contemplated without departing from the scope of the present invention. It is also contemplated that the soft panel top cover assemblies are adapted to selectively individually cover the driver's and passenger's sides of the front cockpit.

It is understood that the left side of the assemblies are generally a mirror-image of the right side.

The 2-door and 4-door descriptions and drawings described herein are not limiting. It is understood that any embodiment, and combinations thereof, described herein can be modified and is/are utilizable on any convertible, 2-door or 4-door vehicle.

The present invention is directed to a stowable soft top assembly, e.g., sliding and/or folding soft top assembly for 4-door and 2-door SUVs. Adaptable for UTVs, etc. is also contemplated.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An articulating front top cover assembly for a vehicle, comprising:
   an articulating portion operably connected to a frame portion and in sealing engagement with a hard top portion;
   a cover connected to a front header of the articulating portion, said articulating portion including front and rear links each pivotally connected toward an end of said front header, wherein the cover covers said front header, and where moving the articulating portion allows the cover to move between at least a closed position and an open position.

2. The articulating front top cover assembly of claim 1, wherein the frame portion comprises at least one door rail operably attached to the vehicle for operably mounting the articulating portion.

3. The articulating front top cover assembly of claim 1, wherein the frame portion comprises a pair of door rails with at least one pivot point on each door rail to pivotally attach the articulating portion.

4. The articulating front top cover assembly of claim 1, wherein the frame portion comprises a pair of door rails with a plurality of pivot points on each door rail to pivotally attach the articulating portion.

5. The articulating front top cover assembly of claim 1, wherein the frame portion is a cassette attachment.

6. The articulating front top cover assembly of claim 5, wherein the cassette is one piece.

7. The articulating front top cover assembly of claim 5, wherein the cassette is a plurality of pieces comprising at least a pair of door rails and a rear header.

8. The articulating front top cover assembly of claim 7, wherein the cassette further comprises the front header.

9. The articulating front top cover assembly of claim 1, wherein the articulating portion includes at least one hinge on each side of the assembly for folding the cover.

10. The articulating front top cover assembly of claim 1, wherein the cover is operably connected to a linkage assembly pivotally connected to both sides of the frame by at least one pivot point, where the front header stays in a horizontal orientation when the cover moves between the closed and open positions.

* * * * *